US011087899B2

(12) United States Patent
Wujcik et al.

(10) Patent No.: US 11,087,899 B2
(45) Date of Patent: Aug. 10, 2021

(54) SELF-HEALING AND STRETCHABLE POLYMERIC COMPOSITIONS

(71) Applicant: The Board of Trustees of the University of Alabama, Tuscaloosa, AL (US)

(72) Inventors: Evan Kane Wujcik, Northport, AL (US); Ju-Won Jeon, Tuscaloosa, AL (US); Yang Lu, Northport, AL (US)

(73) Assignee: The Board of Trustees of the University of Alabama, Tuscaloosa, AL (US)

( * ) Notice: Subject to any disclaimer, the term of this patent is extended or adjusted under 35 U.S.C. 154(b) by 0 days.

(21) Appl. No.: 16/705,516

(22) Filed: Dec. 6, 2019

(65) Prior Publication Data

US 2020/0203035 A1    Jun. 25, 2020

Related U.S. Application Data

(60) Provisional application No. 62/776,008, filed on Dec. 6, 2018.

(51) Int. Cl.
| | |
|---|---|
| *H01B 1/12* | (2006.01) |
| *C08L 33/26* | (2006.01) |
| *C08J 5/18* | (2006.01) |
| *G01L 1/22* | (2006.01) |

(52) U.S. Cl.
CPC ............ *H01B 1/124* (2013.01); *C08J 5/18* (2013.01); *C08L 33/26* (2013.01); *G01L 1/2287* (2013.01); *C08J 2333/26* (2013.01); *C08J 2433/26* (2013.01); *C08L 2203/20* (2013.01)

(58) Field of Classification Search
CPC ...... H01B 1/124; C08L 33/26; C08J 2433/26; C08J 2333/26
USPC ................................ 252/500, 502, 510, 511
See application file for complete search history.

(56) References Cited

U.S. PATENT DOCUMENTS

| | | | | |
|---|---|---|---|---|
| 2012/0138913 | A1* | 6/2012 | Alsayed | H01B 1/02 257/40 |
| 2016/0049217 | A1* | 2/2016 | Tee | H01M 4/622 429/217 |
| 2017/0292008 | A1* | 10/2017 | Yu | H01B 1/127 |
| 2019/0390068 | A1* | 12/2019 | Feig | A61L 27/50 |

FOREIGN PATENT DOCUMENTS

WO    WO-2016090087 A1 *   6/2016    .......... H01M 2/1653

OTHER PUBLICATIONS

Lu, Yang, et al. "Recent developments in bio-monitoring via advanced polymer nanocomposite-based wearable strain sensors." Biosensors and Bioelectronics 123 (2019): 167-177.
S. Park, K. Chung, S. Jayaraman, in Wearable Sensors, Elsevier, 2015, Ch.1.1, 1-23.

(Continued)

*Primary Examiner* — Tri V Nguyen
(74) *Attorney, Agent, or Firm* — Meunier Carlin & Curfman LLC

(57) ABSTRACT

Disclosed herein a self-healing, flexible, conductive compositions. The conductive compositions include conductive polymers and acidic polyacrylamides. The compositions are useful in a wide range of applications, including wearable electronics and sensors. The compositions may be prepared using environmentally friendly procedures.

16 Claims, 28 Drawing Sheets

(56) References Cited

OTHER PUBLICATIONS

Khang, Dahl-Young, et al. "A stretchable form of single-crystal silicon for high-performance electronics on rubber substrates." Science 311.5758 (2006): 208-212.
Wang, Ning, et al. "A tunable strain sensor based on a carbon nanotubes/electrospun polyamide 6 conductive nanofibrous network embedded into poly (vinyl alcohol) with self-diagnosis capabilities." Journal of Materials Chemistry C 5.18 (2017): 4408-4418.
Yamada, Takeo, et al. "A stretchable carbon nanotube strain sensor for human-motion detection." Nature nanotechnology 6.5 (2011): 296.
Cai, Guofa, et al. "Extremely stretchable strain sensors based on conductive self-healing dynamic cross-links hydrogels for human-motion detection." Advanced Science 4.2 (2017): 1600190.
Lipomi, Darren J., et al. "Skin-like pressure and strain sensors based on transparent elastic films of carbon nanotubes." Nature nanotechnology 6.12 (2011): 788.
Yan, Chaoyi, et al. "Highly stretchable piezoresistive graphene—nanocellulose nanopaper for strain sensors." Advanced materials 26.13 (2014): 2022-2027.
Oren, Seval, Halil Ceylan, and Liang Dong. "Helical-shaped graphene tubular spring formed within microchannel for wearable strain sensor with wide dynamic range." IEEE Sensors Letters 1.6 (2017): 1-4.
Boland, Conor S., et al. "Sensitive, high-strain, high-rate bodily motion sensors based on graphene—rubber composites." ACS nano 8.9 (2014): 8819-8830.
Larimi, Seyed Reza, et al. "Low-cost ultra-stretchable strain sensors for monitoring human motion and bio-signals." Sensors and Actuators A: Physical 271 (2018): 182-191.
Yao, Shanshan, and Yong Zhu. "Wearable multifunctional sensors using printed stretchable conductors made of silver nanowires." Nanoscale 6.4 (2014): 2345-2352.
Amjadi, Morteza, et al. "Highly stretchable and sensitive strain sensor based on silver nanowire—elastomer nanocomposite." ACS nano 8.5 (2014): 5154-5163.
Liu, Shuqi, et al. "A high performance self-healing strain sensor with synergetic networks of poly (ε-caprolactone) microspheres, graphene and silver nanowires." Composites Science and Technology 146 (2017): 110-118.
Xu, Feng, Wei Lu, and Yong Zhu. "Controlled 3D buckling of silicon nanowires for stretchable electronics." ACS Nano 5.1 (2011): 672-678.

Yang, Zhen, et al. "Simultaneously detecting subtle and intensive human motions based on a silver nanoparticles bridged graphene strain sensor." ACS applied materials & interfaces 10.4 (2018): 3948-3954.
Amjadi, Morteza, et al. "Stretchable, skin-mountable, and wearable strain sensors and their potential applications: a review." Advanced Functional Materials 26.11 (2016): 1678-1698.
Yu, Xiao-Guang, et al. "A wearable strain sensor based on a carbonized nano-sponge/silicone composite for human motion detection." Nanoscale 9.20 (2017): 6680-6685.
Li, Cheng, et al. "Flexible CNT-array double helices strain sensor with high stretchability for motion capture." Scientific reports 5.1 (2015): 15554.
Seyedin, Mohammad Ziabari, et al. "Strain-responsive polyurethane/PEDOT: PSS elastomeric composite Fibers with high electrical conductivity." Advanced Functional Materials 24.20 (2014): 2957-2966.
Meriga, Venkanna, et al. "Optical, electrical, and electrochemical properties of graphene based water soluble polyaniline composites." Journal of Applied Polymer Science 132.45 (2015).
Yoo, Joung Eun, et al. "Directly patternable, highly conducting polymers for broad applications in organic electronics." Proceedings of the National Academy of Sciences 107.13 (2010): 5712-5717.
Trchová, Miroslava, et al. "FTIR spectroscopic and conductivity study of the thermal degradation of polyaniline films." Polymer Degradation and Stability 86.1 (2004): 179-185.
Cui, Xiufang, et al. "Influence of phytic acid concentration on performance of phytic acid conversion coatings on the AZ91D magnesium alloy." Materials chemistry and physics 111.2-3 (2008): 503-507.
Gorman, Mel. "The evidence from infrared spectroscopy for hydrogen bonding: A case history of the correlation and interpretation of data." (1957): 304.
Liang, Xing, and Stephen A. Boppart. "Biomechanical properties of in vivo human skin from dynamic optical coherence elastography." IEEE Transactions on Biomedical Engineering 57.4 (2009): 953-959.
Zhao, Songfang, et al. "Recent advancements in flexible and stretchable electrodes for electromechanical sensors: strategies, materials, and features." ACS applied materials & interfaces 9.14 (2017): 12147-12164.
Barlian, A. Alvin, et al. "Semiconductor piezoresistance for microsystems." Proceedings of the IEEE 97.3 (2009): 513-552.
Kong, Jeong-Ho, et al. "Simple and rapid micropatterning of conductive carbon composites and its application to elastic strain sensors." Carbon 77 (2014): 199-207.

* cited by examiner

SELF-HEALING AND STRETCHABLE POLYMERIC COMPOSITIONS

CROSS-REFERENCE TO RELATED APPLICATION

This application claims the benefit of U.S. Provisional Application 62/776,008, filed Dec. 6, 2018, the contents of which are hereby incorporated in its entirety.

FIELD OF THE INVENTION

The invention is directed to self-healing and stretchable polymeric compositions. The compositions are useful in a wide variety of strain sensors and wearable electronics.

BACKGROUND

With recent advances in material science and microelectronics, great efforts have been made in the area of stretchable wearable devices, especially stretchable strain sensors for applications such as healthcare and medical diagnosis, e-skin, robotic systems, prosthetics and orthotics, virtual reality, sports, entertainment, among others. Wearable devices can be attached onto clothes or directly worn on the skin for monitoring biochemical signals and body motions. Due to the soft, complaint, and complex nature of human skin, as well as the natural bending or rotational motion associated with joints, a wearable device should be soft and mechanically robust enough for the wearer to comfortably perform motions such as bending, stretching, pressing, and twisting comfortably. In addition—as heavily used and exposed materials—to prevent long term performance decline and deterioration, the ability to continually self-heal without external stimuli is extremely desirable. Conventional semiconductors, including silicon and metal oxide films, possess an intrinsic brittle and rigid nature and are not suitable for wearable strain sensors. Generally, there are three strategies to achieve stretchability: i. designing a stretchable structure as a conductive network in elastomers, ii. uniformly dispersing nanofillers inside an elastomer matrix to reach a percolation threshold, or iii. utilizing intrinsicly conductive and stretchable polymers. To date, the majority of reported strain sensors are based on the first and second approaches, by means of conductive nanofillers including carbon nanotubes (CNTs), graphene, silver nanowires, silicon nanowires, and metallic nanoparticles. Designing stretchable structures (buckling, spring, coil, open mesh, etc.) as the conductive network typically requires complex fabrication procedures, works only in uni-axial stretching directions, has poor interfacial adhesion, and has low cyclic stability. Dispersing nanofillers inside of elastomer matricies to reach a percolation threshold typically needs high nanofiller loadings, exhibits relatively low conductivity, and low workable stretchability. For strain sensors fabricated by these first two approaches, the repeatability of batch-to-batch performance and linearity is poor due to uncontrollable fabrication and nanostructure formation via non-uniform nanofiller size and poor dispersion. The intrinsic conductive and stretchable polymer route is, hence, considered a superior strategy for wearables and bioelectronics. The homogenous and isotropic nature of polymer film preparation permits more scalable, economically-viable, repeatable, and reliable access to the devices, moreover with more response linearity. However, for recent reported conductive polymer based strain sensors, the sensitivity, stretchability, and linearity are still not satisfactory.

There remains a need for improved flexible conductive materials. There remains a need for improved self-healing conductive materials. There remains a need for improved flexible, self-healing, conductive materials. There remains a need for improved materials useful in the manufacture of wearable electronics and strain sensors.

SUMMARY

Disclosed herein are flexible, self-healing, conductive compositions. The compositions include at least one conductive polymer, at least one acidic polyacrylamide, and at least one dopant. In some embodiments, the compositions further include one or more additional conductive material, for instance conductive metals or conductive carbon. In addition to improved flexibility and self-healing properties, the compositions linearly vary in conductivity in response to strain along any axis. As such, the compositions disclosed herein are useful as omnidirectional strain sensors.

The details of one or more embodiments are set forth in the descriptions below. Other features, objects, and advantages will be apparent from the description and from the claims.

DETAILED DESCRIPTION

Figure 1A:
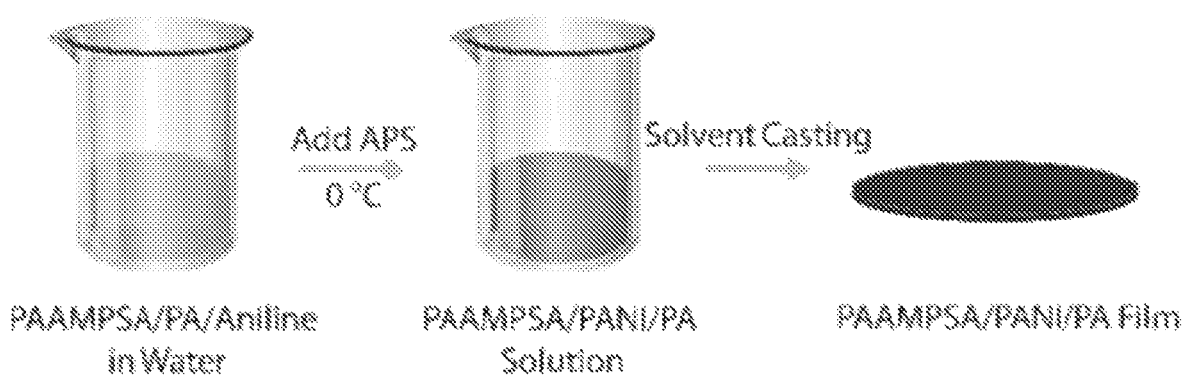
FIG. 1a depicts a schematic illustration showing the synthesis of PAAMPSA/PANI/PA electronic material.
Figure 1B:
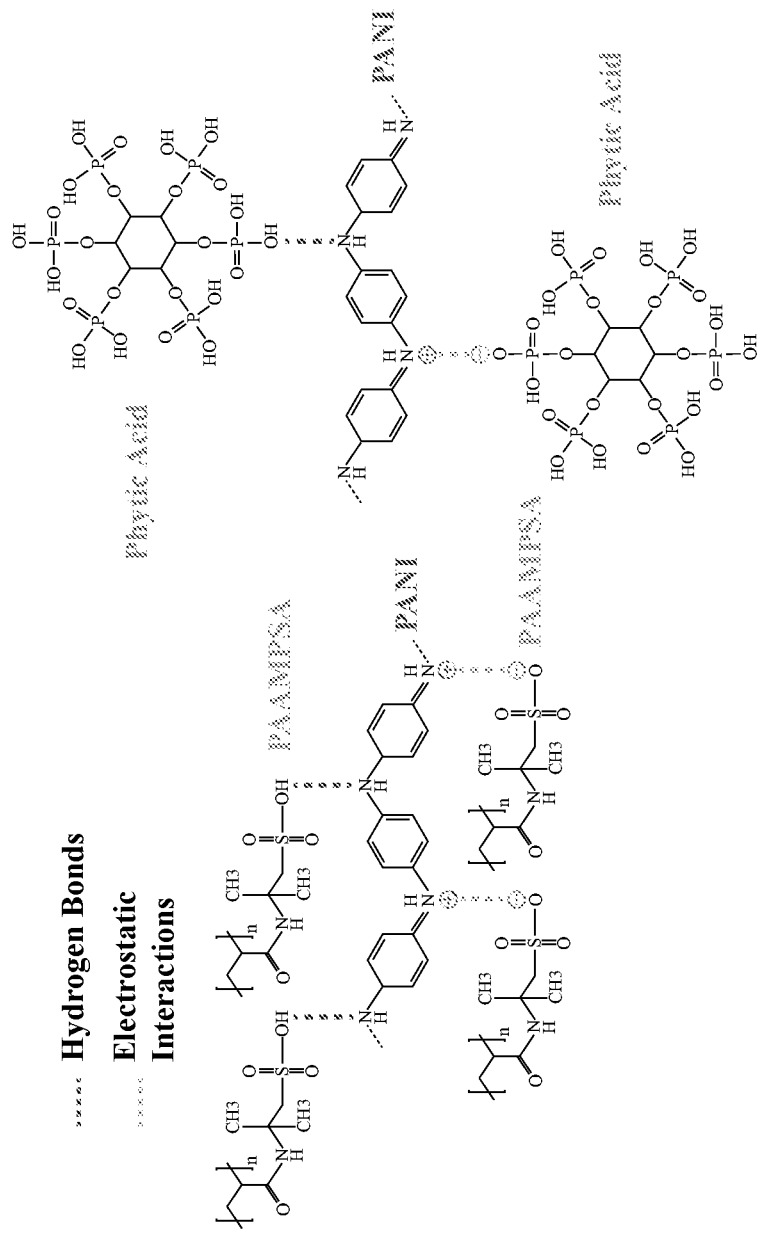
FIG. 1b depicts crosslinkings that form dynamic network by hydrogen bonds and electrostatic interactions between PAAMPSA and PA with PANI.
Figure 1C:
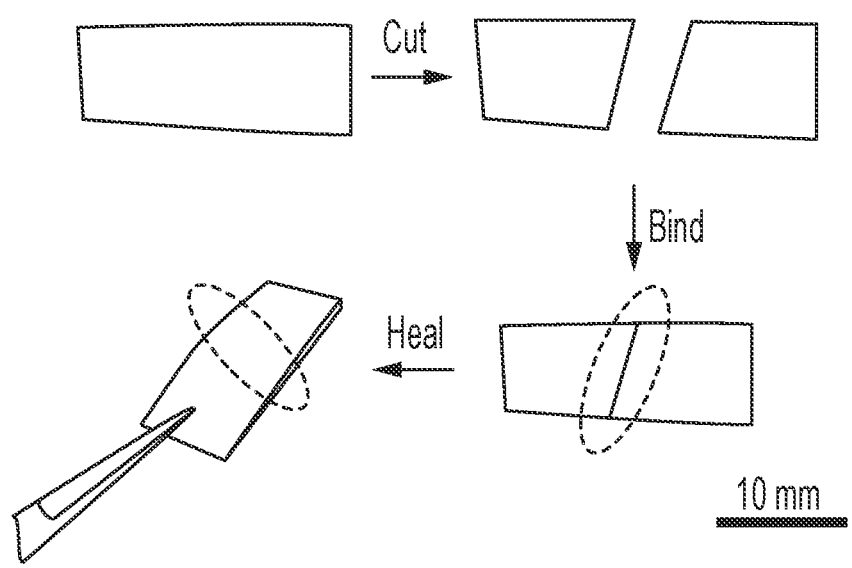
FIG. 1c depicts photographs showing the autonomous self-healing process of a PAAMPSA/PANI/PA electronic material after 3 hours, blue dashed circles show the healed severed surfaces.
Figure 1D:
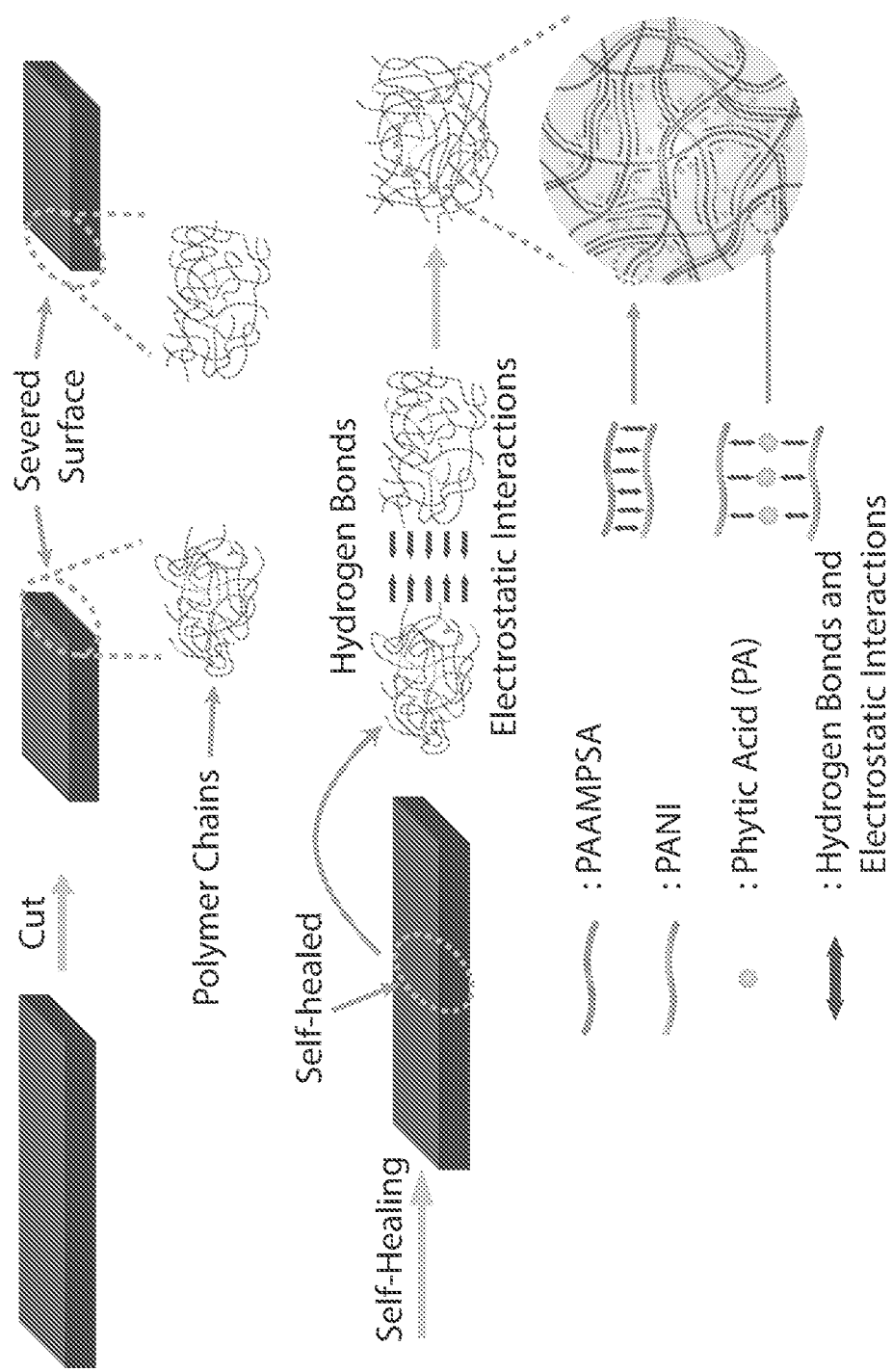
FIG. 1d depicts a schematic diagram of the self-healing process for a PAAMPSA/PANI/PA electronic material.
Figure 1E:
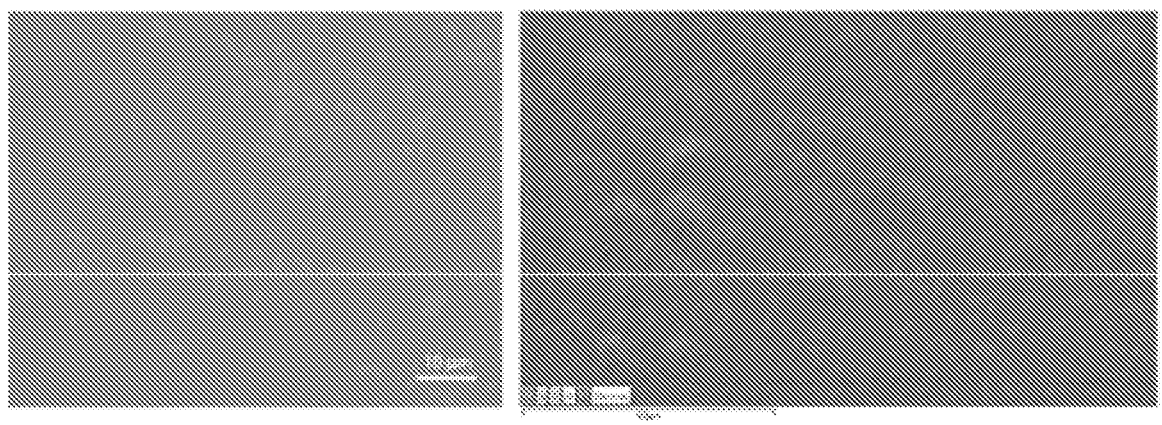
FIG. 1e depicts cross-sectional SEM micrograph and EDS elemental mapping of a PAAMPSA/PANI/PA electronic material.
Figure 1F:
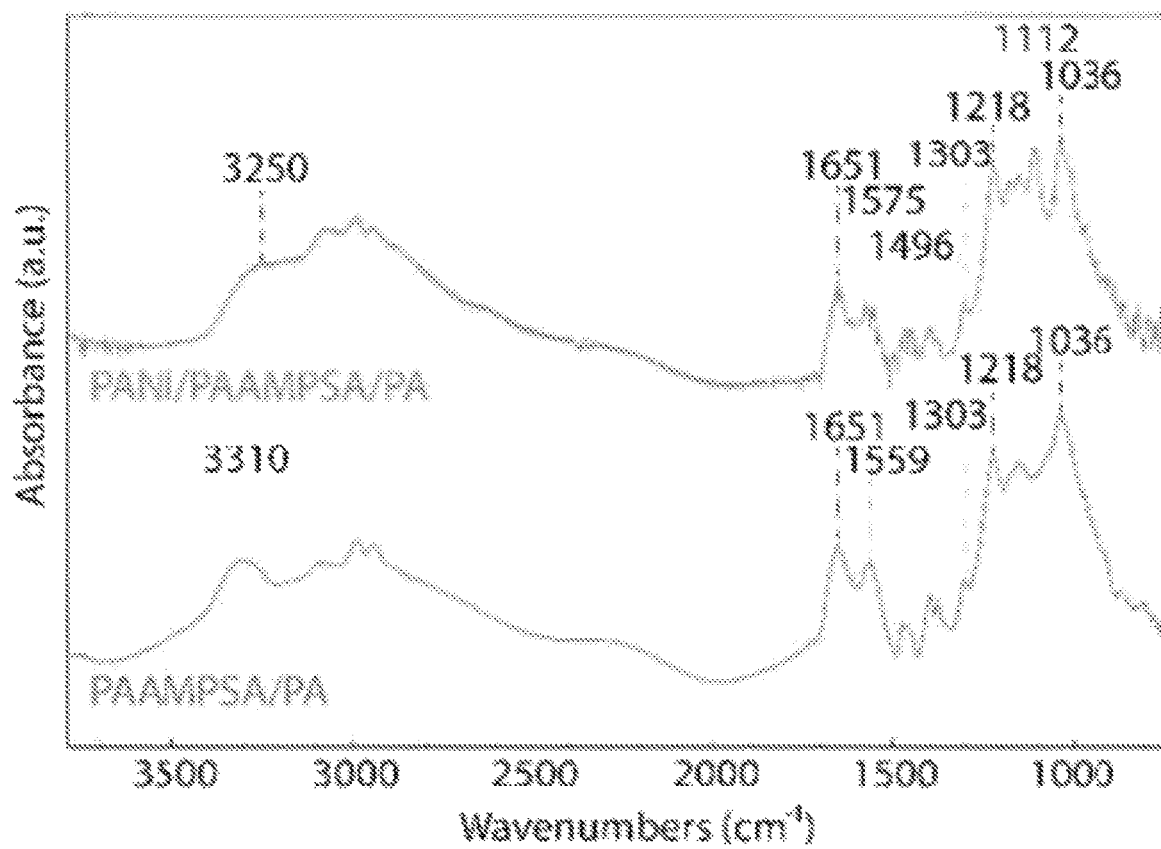
FIG. 1f depicts FT-IR spectra of PAAMPSA/PANI/PA material and PAAMPSA/PA control sample.
Figure 2A:
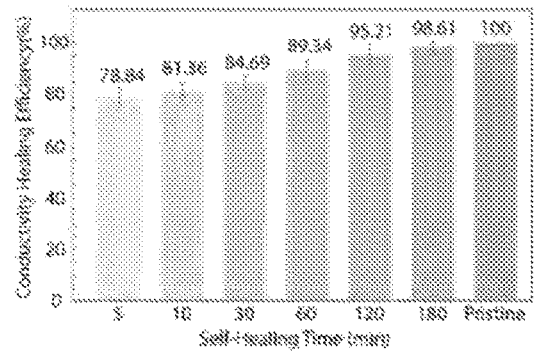
FIG. 2a depicts the healing efficiency (HE %$_c$) of PAAMPSA/PANI/PA as a function of autonomous self-healing time under ambient conditions. Tests were repeated for five times with error bars indicating sample standard deviation.
Figure 2B:
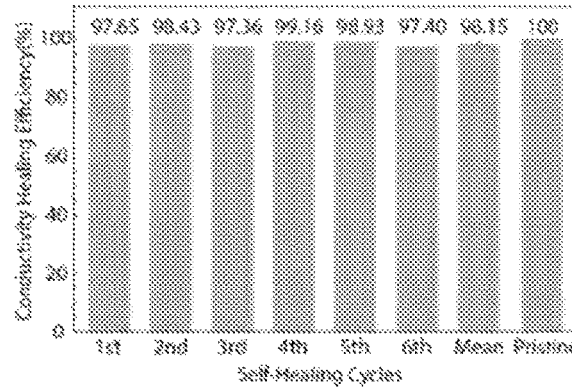
FIG. 2b depicts self-healing cycling tests of the cut-heal process at the same location for 6 cycles.
Figure 2C:
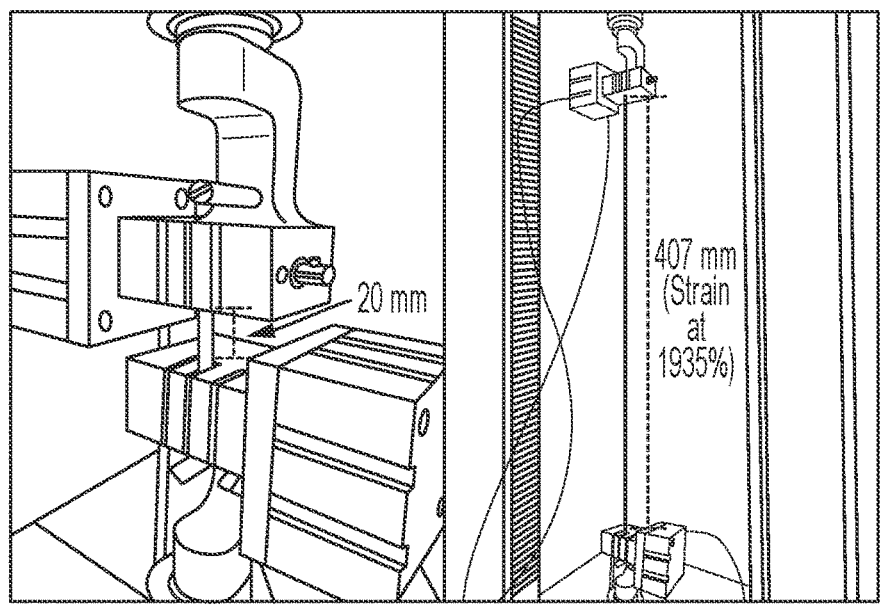
FIG. 2c depicts photographs showing the extremely high stretchability of a PAAMPSA/PANI/PA electronic material.
Figure 2D:
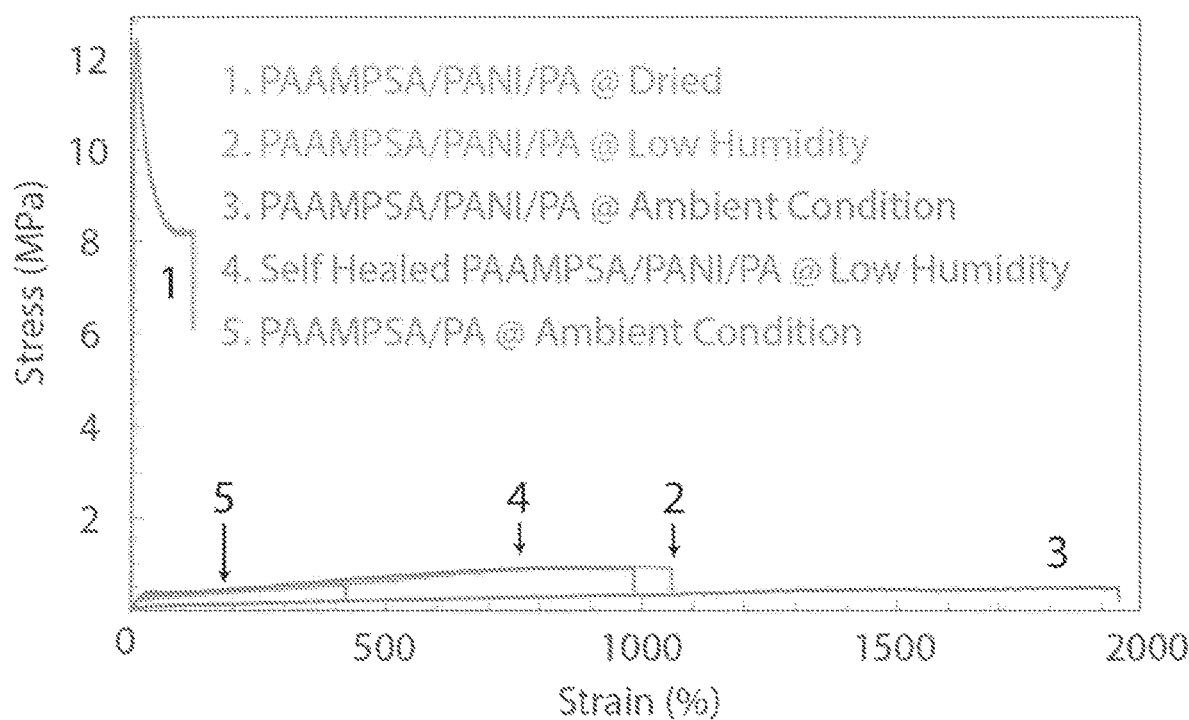
FIG. 2d depicts stress-strain curves of: PAAMPSA/PANI/PA under three conditions of dried (1), low humidity (2) and ambient conditions (3). Self-healed sample under low humidity conditions (4). PAAMPSA/PA control sample under ambient conditions (5).
Figure 2E:
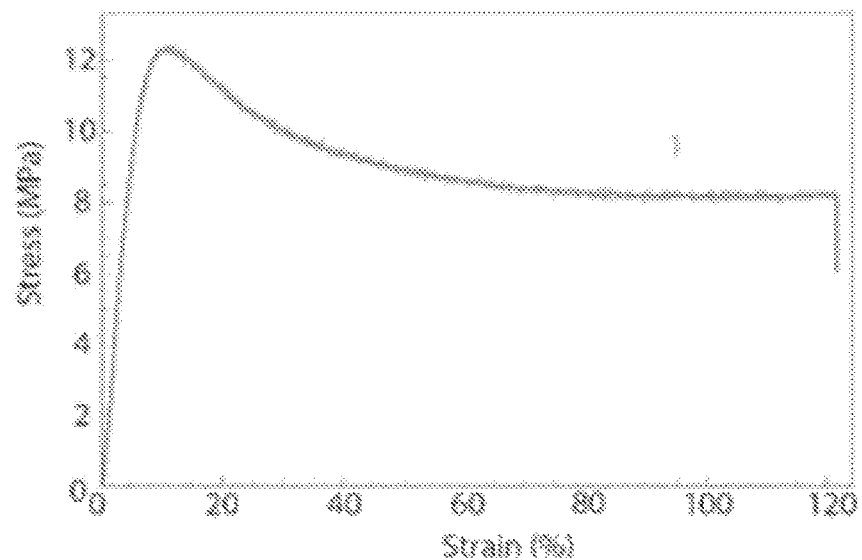
FIG. 2e depicts the curve of (1) from FIG. 2d.
Figure 2F:
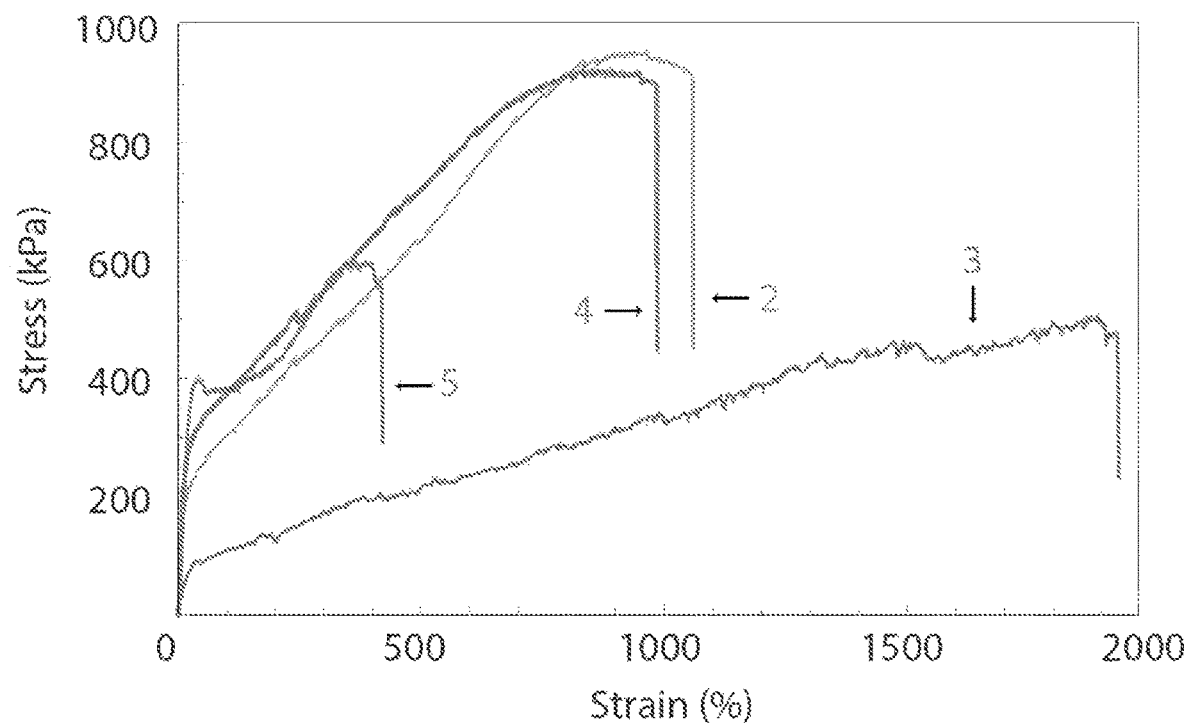
FIG. 2f depicts the curves of (2-5) from FIG. 2d.
Figure 2G:
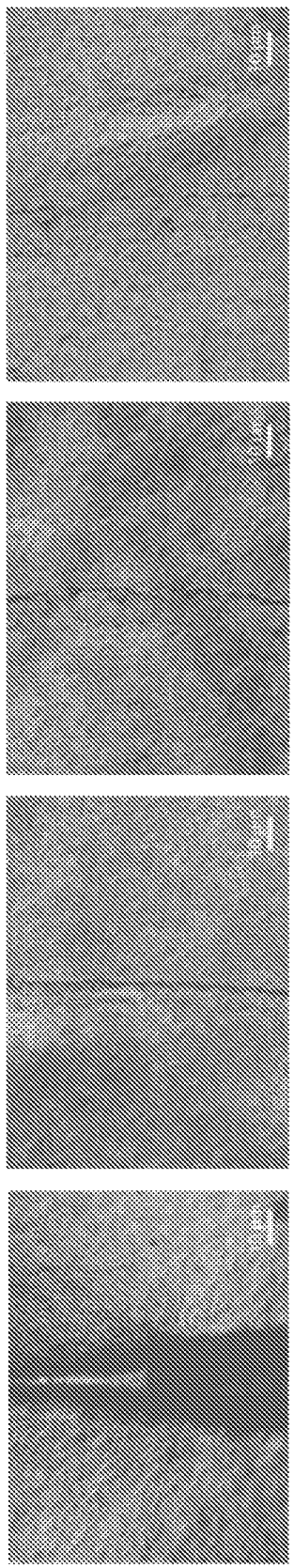
FIG. 2g depicts optical images exhibiting the evolution of a rapid scratch self-healing process of a PAAMPSA/PANI/PA electronic material. The scratched surface is gently pressed for several seconds (~5 seconds) to close the gap and let heal autonomously without intervention. Evolution time from second to third and last image is 5, 10 min, respectively.
Figure 2H:
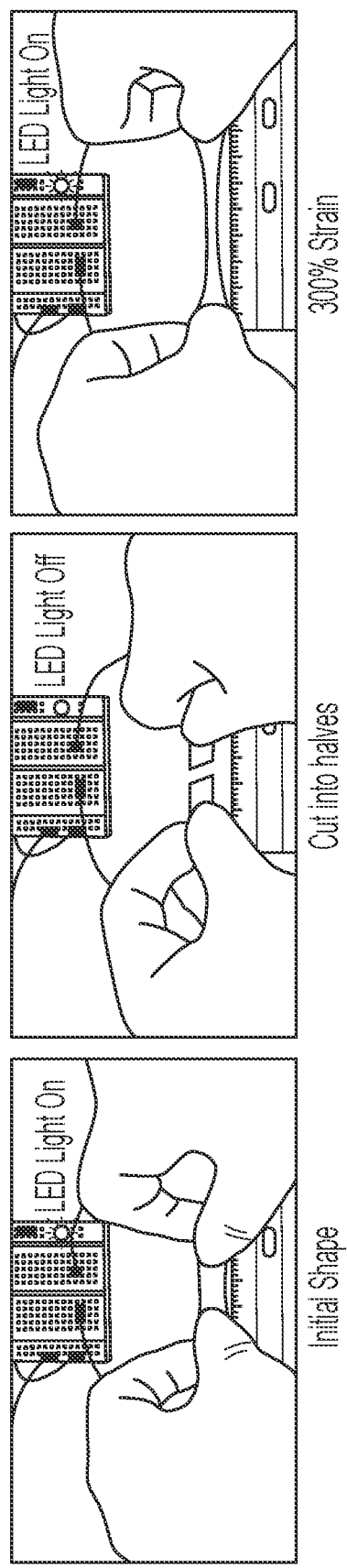
FIG. 2h depicts a demonstration of instant healing of a severed conductive material in series with an LED light showing the restored electrical conductivity and material stretchability. 1: undamaged conductor. 2: completely severed material causing open circuit. 3: with a gently press for only 5 seconds, electrical conductivity and mechanical strength were restored showing an excellent healing performance.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The term "alkyl" as used herein is a branched or unbranched hydrocarbon group such as methyl, ethyl, n-propyl, isopropyl, n-butyl, isobutyl, t-butyl, pentyl, hexyl, heptyl, octyl, nonyl, decyl, dodecyl, and the like. The alkyl group can also be substituted or unsubstituted. Unless stated otherwise, the term "alkyl" contemplates both substituted and unsubstituted alkyl groups. The alkyl group can be substituted with one or more groups including, but not limited to, alkoxy, alkenyl, alkynyl, cycloalkyl, heterocycloalkyl, aryl, heteroaryl, aldehyde, amino, carboxylic acid, ester, ether, halide, hydroxy, ketone, nitro, silyl, sulfo-oxo, or thiol. An alkyl group which contains no double or triple carbon-carbon bonds is designated a saturated alkyl group, whereas an alkyl group having one or more such bonds is designated an unsaturated alkyl group. Unsaturated alkyl groups having a double bond can be designated alkenyl groups, and unsaturated alkyl groups having a triple bond can be designated alkynyl groups. Unless specified to the contrary, the term alkyl embraces both saturated and unsaturated groups.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl" is a cycloalkyl group as defined above where at least one of the carbon atoms of the ring is replaced with a heteroatom such as, but not limited to, nitrogen, oxygen, sulfur, selenium or phosphorus. The cycloalkyl group and heterocycloalkyl group can be substituted or unsubstituted. Unless stated otherwise, the terms "cycloalkyl" and "heterocycloalkyl" contemplate both substituted and unsubstituted cyloalkyl and heterocycloalkyl groups. The cycloalkyl group and heterocycloalkyl group can be substituted with one or more groups including, but not limited to, alkyl, alkoxy, alkenyl, alkynyl, cycloalkyl, heterocycloalkyl, aryl, heteroaryl, aldehyde, amino, carboxylic acid, ester, ether, halide, hydroxy, ketone, nitro, silyl, sulfo-oxo, or thiol. A cycloalkyl group which contains no double or triple carbon-carbon bonds is designated a saturated cycloalkyl group, whereas an cycloalkyl group having one or more such bonds (yet is still not aromatic) is designated an unsaturated cycloalkyl group. Unless specified to the contrary, the term cycloalkyl embraces both saturated and unsaturated, non-aromatic, ring systems.

The term "aryl" as used herein is an aromatic ring composed of carbon atoms. Examples of aryl groups include, but are not limited to, phenyl and naphthyl, etc. The term "heteroaryl" is an aryl group as defined above where at least one of the carbon atoms of the ring is replaced with a heteroatom such as, but not limited to, nitrogen, oxygen, sulfur, selenium or phosphorus. The aryl and heteroaryl group can be substituted or unsubstituted. Unless stated otherwise, the terms "aryl" and "heteroaryl" contemplate both substituted and unsubstituted aryl and heteroaryl groups. The aryl group and heteroaryl group can be substituted with one or more groups including, but not limited to, alkyl, alkoxy, alkenyl, alkynyl, cycloalkyl, heterocycloalkyl, aryl, heteroaryl, aldehyde, amino, carboxylic acid, ester, ether, halide, hydroxy, ketone, nitro, silyl, sulfo-oxo, or thiol.

Exemplary heteroaryl and heterocyclyl rings include: benzimidazolyl, benzofuranyl, benzothiofuranyl, benzothiophenyl, benzoxazolyl, benzoxazolinyl, benzthiazolyl, benztriazolyl, benztetrazolyl, benzisoxazolyl, benzisothiazolyl, benzimidazolinyl, carbazolyl, 4aH carbazolyl, carbolinyl, chromanyl, chromenyl, cirrnolinyl, decahydroquinolinyl, 2H,6H-1,5,2-dithiazinyl, dihydrofuro[2,3 b]tetrahydrofuran, furanyl, furazanyl, imidazolidinyl, imidazolinyl, imidazolyl, 1H-indazolyl, indolenyl, indolinyl, indolizinyl, indolyl, 3H-indolyl, isatinoyl, isobenzofuranyl, isochromanyl, isoindazolyl, isoindolinyl, isoindolyl, isoquinolinyl, isothiazolyl, isoxazolyl, methylenedioxyphenyl, morpholinyl, naphthyridinyl, octahydroisoquinolinyl, oxadiazolyl, 1,2,3-oxadiazolyl, 1,2,4-oxadiazolyl, 1,2,5-oxadiazolyl, 1,3,4-oxadiazolyl, oxazolidinyl, oxazolyl, oxindolyl, pyrimidinyl, phenanthridinyl, phenanthrolinyl, phenazinyl, phenothiazinyl, phenoxathinyl, phenoxazinyl, phthalazinyl, piperazinyl, piperidinyl, piperidonyl, 4-piperidonyl, piperonyl, pteridinyl, purinyl, pyranyl, pyrazinyl, pyrazolidinyl, pyrazolinyl, pyrazolyl, pyridazinyl, pyridooxazole, pyridoimidazole, pyridothiazole, pyridinyl, pyridyl, pyrimidinyl, pyrrolidinyl, pyrrolinyl, 2H-pyrrolyl, pyrrolyl, quinazolinyl, quinolinyl, 4H-quinolizinyl, quinoxalinyl, quinuclidinyl, tetrahydrofuranyl, tetrahydroisoquinolinyl, tetrahydroquinolinyl, tetrazolyl, 6H-1,2,5-thiadiazinyl, 1,2,3-thiadiazolyl, 1,2,4-thiadiazolyl, 1,2,5-thiadiazolyl, 1,3,4-thiadiazolyl, thianthrenyl, thiazolyl, thienyl, thienothiazolyl, thienooxazolyl, thienoimidazolyl, thiophenyl, and xanthenyl.

The terms "alkoxy," "cycloalkoxy," "heterocycloalkoxy," "cycloalkoxy," "aryloxy," and "heteroaryloxy" have the aforementioned meanings for alkyl, cycloalkyl, heterocycloalkyl, aryl and heteroaryl, further providing said group is connected via an oxygen atom.

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valencies of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc. Unless specifically stated, a substituent that is said to be "substituted" is meant that the substituent can be substituted with one or more of the following: alkyl, alkoxy, alkenyl, alkynyl, cycloalkyl, heterocycloalkyl, aryl, heteroaryl, aldehyde, amino, carboxylic acid, ester, ether, halide, hydroxy, ketone, nitro, silyl, sulfo-oxo, or thiol. In a specific example, groups that are said to be substituted are substituted with a protic group, which is a group that can be protonated or deprotonated, depending on the pH.

Disclosed herein are flexible, self-healing, conductive compositions disclosed herein exhibit enhance stretchability, for instance showing an elongation at break of at least 500%, at least 750%, at least 1,000%, at least 1,500%, at least 2,000%, or at least 2,500%. The compositions further exhibit enhanced flexibility, as they can be twisted along an axis at least 180°, at least 360°, at least 540°, or at least 720° without breaking. Additionally, the compositions can be bent up to 180° (i.e., folded in half) without breaking. Importantly, as the material is stretched, bent or twisted, the conductivity changes in a linear fashion regardless of the direction of the strain. Such films that undergo resistance change regardless of the direction of the strain can be designated omnidirectional. This represents an advance over the art, in which sensors are often only capable of detecting strains along a single axis.

The compositions exhibit self-healing properties, for instance having a mechanical healing efficiency of at least 90%, at least 92.5%, at least 95%, at least 97.5%, at least 99%, or at least 99.5% when the composition is completely severed. Although the healing proceeds heals quickly simply by placing two pieces of the composition in physical contact with one another (healing time measured in hours), the self-healing rate dramatically increases when gentle pressure (i.e., finger pressure) is applied (healing time measured in seconds).

The self-healed compositions exhibit substantially the same electrical resistance compared with the material prior to cutting. For instance, the electrical resistance of the self-healed system can be at least at least 90%, at least 92.5%, at least 95%, at least 97.5%, at least 99%, or at least 99.5% that of the system prior to cutting.

The compositions include at least one conductive polymer entangled with at least one acidic polyacrylamide, and at least one small molecule dopant having from 2-10 acidic groups.

Suitable conductive polymers include π-conjugated polymer systems, for instance poly(anilines), poly(pyrroles), poly(thiophenes), poly(phenylene sulfides), poly(selenophenes), poly(furans), poly(azepines), poly(fluorenes), poly(acetylenes), poly(phenylenevinylenes), poly(acenes), poly(thiophenylvinylenes), poly(phenylenes), poly(pyrenes), poly(azulenes), poly(naphtalenes), and copolymers thereof. Copolymers include random copolymers, block copolymers, and alternating copolymers. In some cases, the π-conjugated polymer may include one or more substituents such as alkyl, hydroxyl, alkoxy, carboxyl, amino, alkylamino, dialkylamino, cyano, nitro, halo (F, Cl, Br, I), thio, and sulfo along the polymer backbone. In some embodiments, the π-conjugated system includes at least one monomer unit containing a basic nitrogen atom.

In some embodiments, the conductive polymer can have a molecular weight from 3,000 Da to 5000 kDa, from 5,000 Da to 2500 kDa, from 5,000 Da to 1,000 kDa, from 5,000 Da to 500 kDa, from 5,000 Da to 250 kDa, from 5,000 Da to 100 kDa, from 5,000 Da to 50 kDa, from 5,000-1,000,000 Da, from from 5,000-500,000 Da, from 5,000-250,000 Da, from 5,000-100,000 Da, from 25,000-1,000,000 Da, from 50,000-1,000,000 Da, from 100,000-1,000,000 Da, from 500,000-1,000,000 Da, or from 1-2,500 kDa.

Exemplary conductive polymers include polypyrrole, poly(N-methylpyrrole), poly(3-methylpyrrole), poly(3-ethylpyrrole), poly(3-n-propylpyrrole), poly(3-butylpyrrole), poly(3-octylpyrrole), poly(3-decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3-methyl-4-carboxybutylpyrrole), poly(3-hydroxypyrrole), poly(3-methoxypyrrole), poly(3-ethoxypyrrole), poly(3-butoxypyrrole), poly(3-hexyloxypyrrole), poly(3-methyl-4-hexyloxypyrrole), poly(3-methyl-4-hexyloxypyrrole), poly(thiophene), poly(3-methylthiophene), poly(3-ethylthiophene), poly(3-propylthiophene), poly(3-butylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3-chlorothiophene), poly(3-iodothiophene), poly(3-cyanothiophene), poly(3-phenylthiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-heptyloxythiophene), poly(3-octyloxythiophene), poly(3-decyloxythiophene), poly(3-dodecyloxythiophene), poly(3-octadecyloxythiophene), poly(3,4-dihydroxythiophene), poly(3,4-dimethoxythiophene), poly(3,4-diethoxythiophene), poly(3,4-dipropoxythiophene), poly(3,4-dibutoxythiophene), poly(3,4-dihexyloxythiophene), poly(3,4-diheptyloxythiophene), poly(3,4-dioctyloxythiophene), poly(3,4-didecyloxythiophene), poly(3,4-didodecyloxythiophene), poly(3,4-ethylenedioxythiophene), poly(3,4-propylenedioxythiophene), poly(3,4-butenedioxythiophene), poly(3-methyl-4-methoxythiophene), poly(3-methyl-4-ethoxythiophene), poly(3-carboxythiophene), poly(3-methyl-4-carboxythiophene), poly(3-methyl-4-carboxyethylthiophene), poly(3-methyl-4-carboxybutylthiophene), polyaniline, poly(2-methylaniline), poly(3-isobutylaniline), poly(2-anilinesulfonic acid), poly(3-anilinesulfonic acid), and copolymers thereof.

In some embodiments, the conductive polymer can include one or more repeating units of Formula (1a) or Formula (1b):

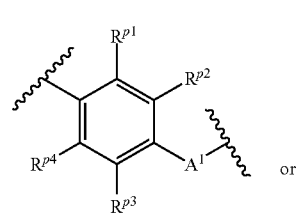

[Formula (1a)]

or

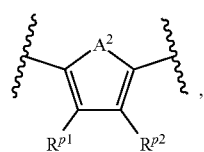

[Formula (1b)]

wherein $R^{p1}$, $R^{p2}$, $R^{p3}$, and $R^{p4}$ are independently selected from hydrogen, $C_{1-10}$alkyl, OH, $C_{1-10}$alkoxy, $NH_2$, $C_{1-10}$alkylamine, $C_{1-10}$dialkylamine, $C_{1-10}$haloalkyl, $C_{1-10}$haloalkoxy, aryl, heterocyclyl, F, Cl, Br, I, CN, COOH, and $NO_2$, and wherein either $R^{p1}$ and $R^{p2}$ or $R^{p3}$ and $R^{p4}$ may together form a ring; and $A^1$ and $A^2$ are independently selected from $NR^{p5}$, O, or S; wherein $R^{p5}$ is hydrogen or $C_{1-10}$alkyl.

Preferred conductive polymers include poly(anilines), poly(thiophenes), and poly(pyrroles).

The acidic polyacrylamide can be any polyacrylamide that is derived, at least in part, from an alkyl acrylamide that is substituted with at least one acidic group, for instance phosphonate ($—PO_3H$) carboxylate ($—COOH$), or sulfonate group ($—SO_3H$). Such monomers are designated acidic alkyl acrylamides.

In some embodiments, the acidic polyacrylamide can include repeating units of Formula (2):

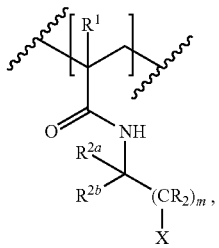

[Formula (2)]

wherein:
$R^1$ is selected from hydrogen and methyl;
$R^{2a}$ and $R^{2b}$ are independently selected from hydrogen, $C_{1-4}$alkyl, wherein $R^{2a}$ and $R^{2b}$ may together from a ring;
R is in each case independently selected from H, F, Cl, Br, $C_{1-4}$alkyl, or $OC_{1-4}$alkyl;
m is selected from 1, 2, 3, 4, 5, or 6; and
X is —$SO_3H$, —$PO_3H$, or —COOH.

In certain preferred embodiments R is in each case H, M is 1, and X is $SO_3H$. Also preferred are embodiments in which $R^{2a}$ and $R^{2b}$ are each methyl and $R^1$ is hydrogen.

The acidic polyacrylamide can have an average molecular weight from 200-2,500 kDa, from 200-2,000 kDa, from 200-1,500 kDa, from 200-1,000 kDa, from 500-2,500 kDa, from 500-2,000 kDa, from 500-1,500 kDa, or from 500-1,000 kDa.

The acidic polyacrylamide can be a homopolymer derived from an acidic alkyl acrylamide, or can be a copolymer that includes as a constituent monomer an acidic alkyl acrylamide. In some embodiments, the copolymer is a random copolymer, a block copolymer, or a regular, repeating copolymer. Suitable co-monomers include (meth)acrylates, (meth)arcrylamides, vinylstyrenes, and ethylenically unsaturated carboxylic acid compounds. Suitable co-monomers include compounds of Formula (2c)

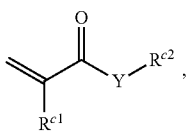

[Formula (2c)]

wherein $Rc^1$ is selected from hydrogen and methyl;
$R^{c2}$ is selected from hydrogen, $C_{1-8}$alkyl and aryl; and
Y is selected from O and $NR^{c3}$, wherein $R^{c3}$ is selected from hydrogen, $C_{1-8}$alkyl and aryl, wherein each alkyl and aryl group may be substituted one or more times as defined herein.

Exemplary compounds of Formula (2c) include methyl (meth)acrylate, ethyl (meth)acrylate, n-propyl (meth)acrylate, i-propyl (meth)acrylate, n-butyl (meth)acrylate, n-hexyl (meth)acrylate, octyl (meth)acrylate, 2-ethylhexyl (meth)acrylate, 2-propylheptyl (meth)acrylate, glycidyl (meth)acrylate, acetoxyethyl (meth)acrylate, acetoacetoxyethyl (meth)acrylate, 2-dimethylaminoethyl (meth)acrylate, 3-dimethylaminopropyl (meth)acrylate, 2-aminoethyl (meth)acrylate, 2-diethylaminoethyl (meth)acrylate, 3-aminopropyl (meth)acrylate, 3-diethylaminopropyl (meth)acrylate, alkoxy polyethylene glycol (meth)acrylates, 2-hydroxyethyl (meth)acrylate, 2-hydroxypropyl (meth)acrylate, 3-hydroxypropyl (meth)acrylate, 4-hydroxybutyl (meth)acrylate, 2-acryloxy ethylcarboxylate, 2-acryloxy ethylsulfonate, and 2-acryloxy ethylphosphate, methyl (meth)acrylamide, ethyl (meth)acrylamide, n-propyl (meth)acrylamide, i-propyl (meth)acrylamide, n-butyl (meth)acrylamide, n-hexyl (meth)acrylamide, octyl (meth)acrylamide, 2-ethylhexyl (meth)acrylamide, 2-propylheptyl (meth)acrylamide, glycidyl (meth)acrylamide, acetoxyethyl (meth)acrylamide, acetoacetoxyethyl (meth)acrylamide, 2-dimethylaminoethyl (meth)acrylamide, 3-dimethylaminopropyl (meth)acrylamide, 2-aminoethyl (meth)acrylamide, 2-diethylaminoethyl (meth)acrylamide, 3-aminopropyl (meth)acrylamide, 3-diethylaminopropyl (meth)acrylamide, alkoxy polyethylene glycol (meth)acrylamides, 2-hydroxyethyl (meth)acrylamide, 2-hydroxypropyl (meth)acrylamide, 3-hydroxypropyl (meth)acrylamide, 4-hydroxybutyl (meth)acrylamide, 2-acryloxy ethylcarboxylate, 2-acryloxy ethylsulfonate, and 2-acryloxy ethylphosphate.

Exemplary ethylenically unsaturated acids include acrylic acid, methacrylic acid, itaconic acid, maleic acid, fumaric acid, crotonic acid, vinylacetic acid, vinyllactic acid, vinylsulfonic acid, styrenesulfonic acid, acrylamidomethylpropanesulfonic acid, sulfopropyl acrylate, sulfopropyl methacrylate.

In some embodiments, the weight ratio of the acidic acrylamide to co-monomer may be from 1:100 to 100:1, from 1:100 to 1:1, from 1:50 to 1:1, from 1:25 to 1:1, from 1:10 to 1:1, from 1:5 to 1:1, from 1:1 to 5:1, from 1:1 to 10:1, from 1:1 to 25:1, from 1:1 to 50:1, or from 1:1 to 100:1.

The small molecule dopant can be any small molecule having 2-10 acidic groups. As used herein, a small molecule is a compound having a molecular weight that is less than about 1,000 Daltons. Suitable acidic groups include COOH, $SO_3H$, and $PO_3H$. The small molecule dopant can be a compound having a singular type of acidic group, or can have multiple types of acidic groups. Exemplary small molecules include carbocyclic and aryl compounds bearing 2-10 acidic groups. In some embodiments, the small molecule dopant can be a compound of Formula (3):

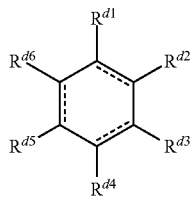

[Formula (3)]

wherein ∥ represents a single or double bond, and each of $R^{d1}$, $R^{d2}$, $R^{d3}$, $R^{d4}$, $R^{d5}$, and $R^{d6}$ are independently selected from hydrogen, $C_{1-10}$alkyl, OH, $C_{1-10}$alkoxy, $C_{1-10}$haloalkyl, $C_{1-10}$haloalkoxy, aryl, heterocyclyl, F, Cl, Br, I, CN, COOH, $SO_3H$, $PO_3H$, and $NO_2$, and wherein any of $R^{d1}$, $R^{d2}$, $R^{d3}$, $R^{d4}$, $R^{d5}$, and $R^{d6}$ may together form a ring; providing that at least two of $R^{d1}$, $R^{d2}$, $R^{d3}$, $R^{d4}$, $R^{d5}$, and $R^{d6}$ are COOH, $SO_3H$, or $PO_3H$. Mixtures of different dopants may also be employed.

Exemplary small molecule dopants include phytic acid, 1,3,5-cyclohexanetricarboxylic acid, 1,2,3-benzenetricarboxylic acid, and 1,2,3,4-benzenetetracarboxylic acid.

The compositions disclosed herein can include the conductive polymer, acidic polyacrylamide, and small molecule dopant in a variety of different ratios. For instance, the weight ratio of the conductive polymer to acidic polyacrylamide can be from 1:500 to 1:2, from 1:250 to 1:2, from 1:100 to 1:2, from 1:50 to 1:2, from 1:25 to 1:2, from 1:15 to 1:2, or from 1:15 to 1:5. The weight ratio of the conductive polymer to small molecule dopant can be from 1:20 to 2:1, from 1:10 to 2:1, from 1:10 to 1:1, or from 1:5 to 1:1.

In certain embodiments, the compositions can further include one or more additional conductive materials. Exemplary conductive materials include conductive metals, for instance silver, copper, or gold, or conductive carbon, e.g., carbon black, carbon nanotubes.

In some instances the conductive material can be in the form of particles, i.e., nanoparticles or microparticles. Nanoparticles can have an average particle size (d50) between 1-1,000 nm, between 1-500 nm, between 1-250 nm, between 1-100 nm, between 1-50 nm, between 50-1,000 nm, between 50-500 nm, between 50-250 nm, between 50-100 nm, between 100-1,000 nm, between 100-750 nm, between 100-500 nm, between 100-250 nm, between 250-1,000 nm, between 250-750 nm, between 250-500 nm, between 500-1,000 nm, between 500-750 nm, or between 750-1,000 nm. Microparticles can have an average particle size (d50) between 1-1,000 µm, between 1-500 µm, between 1-250 µm, between 1-100 µm, between 1-50 µm, between 50-1,000 µm, between 50-500 µm, between 50-250 µm, between 50-100 µm, between 100-1,000 µm, between 100-750 µm, between 100-500 µm, between 100-250 µm, between 250-1,000 µm, between 250-750 µm, between 250-500 µm, between 500-1,000 µm, between 500-750 µm, or between 750-1,000 µm.

In other embodiments, the conductive material can be metal nanowires. The nanowires can have an average wire diameter between 1-1,000 nm, between 1-500 nm, between 1-250 nm, between 1-100 nm, between 5-100 nm, between 5-75 nm, between 5-50 nm, between 5-25 nm, between 10-100 nm, between 10-75 nm, between 10-50 nm, between 10-25 nm, between 25-100 nm, between 25-75 nm, or between 25-50 nm. The nanowires can have an average length between 1-1,000 µm, between 1-500 µm, between 1-250 µm, between 1-100 µm, between 1-50 µm, between 10-100 µm, between 10-75 µm, between 10-50 µm, between 10-25 µm, between 25-100 µm, between 25-75 µm, between 25-50 µm, between 50-100 µm, between 50-75 µm, between 75-100 µm, between 100-250 µm, between 250-500 µm, between 250-750 µm, between 500-1,000 µm, between 500-750 µm, or between 750-1,000 µm. It is preferred that the nanowires have an average diameter between 10-100 nm, and an average length between 10-100 µm.

The conductive material may be incorporated into the composition in a variety of ratios. For instance, the weight ratio of the conductive material:conductive polymer (measured per weight monomer precursor) can be from 25:1 to 1:25, from 10:1 to 1:10, from 5:1 to 1:5, from 2.5:1 to 1:2.5, from 1:1 to 1:2.5, from 1:1 to 1:5, from 1:1 to 1:10, from 1:1 to 1:25, from 25:1 to 1:1, from 10:1 to 1:1, from 5:1 to 1:1, from 2.5:1 to 1:1, from 1:2.5 to 1:10, from 2.5:1 to 10:1, from 1:5 to 1:10, or from 5:1 to 10:1.

The entangled polymer compositions may be prepared by polymerizing either of the conductive polymer or acidic polyacrylamide polymer in the presence of the already-formed polymer. For instance, monomer precursors of the conductive polymer may be combined in a reaction medium with the acidic polyacrylamide, and then subjected to conditions suitable to form the conductive polymer. Suitable monomer precursor for the conductive polymer include anilines, pyrroles, azepines, furans, thiophenes, selenothiophenes, or a combination thereof. The monomer precursor may be substituted as described above. In other embodiments, the acidic alkyl acrylamide may be combined with the conductive polymer, and then subjected to conditions suitable to form the acidic polyacrylamide. Generally, the small molecule dopant will be present in the reaction medium as well.

In certain embodiments, the monomer precursors of the conductive polymer can be compounds of Formula (4a) or (4b):

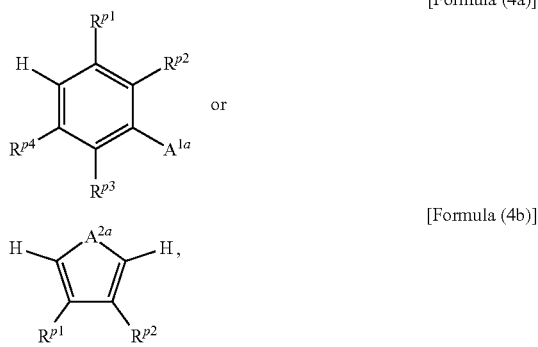

wherein $R^{p1}$, $R^{p2}$, $R^{p3}$, and $R^{p4}$ are as defined above, and $A^{1a}$ and $A^{2a}$ are independently selected from OH, SH, $NHR^{p5}$, wherein $R^{p5}$ is hydrogen or $C_{1-10}$alkyl.

The polymer, monomer precursor, and small molecule dopant can be present in the reaction medium in a variety of different ratios. For instance, the weight ratio of the conductive polymer monomer precursor to acidic polyacrylamide can be from 1:500 to 1:2, from 1:250 to 1:2, from 1:100 to 1:2, from 1:50 to 1:2, from 1:25 to 1:2, from 1:15 to 1:2, or from 1:15 to 1:5. The weight ratio of the conductive polymer monomer precursor to small molecule dopant can be from 1:20 to 2:1, from 1:10 to 2:1, from 1:10 to 1:1, or from 1:5 to 1:1.

The reaction medium will generally include a solvent, for instance water and optionally a water-miscible co-solvent. Exemplary water-miscible co-solvents include acetic acid, acetone, acetonitrile, propylene glycol, ethanol, ethylene glycol, methanol, propanol, DMSO, dimethoxy ethane, DMF, THF and diethyl ether.

The conductive polymer and acidic polyacrylamide may be prepared by contacting the appropriate monomer with an oxidant. Exemplary oxidants include $(NH_4)_2S_2O_8$, $Na_2S_2O_8$ and $K_2S_2O_8$, iron (III) chloride, copper (II) chloride, silver nitrate, chloroauric acid, ammonium cerium(IV) nitrate, hydrogen peroxide, or a combination thereof. The molar ratio of oxidant:monomer precursor may be from 1:100 to 100:1, from 10:1 to 1:10, from 5:1 to 1:5, from 1:1 to 1:5, from 1:1 to 1:3, from 1:2 to 1:5, from 1:5 to 1:10, from 5:1 to 1:1, from 3:1 to 1:1, from 5:1 to 2:1, or from 1:10 to 1:5. Generally, the oxidant will be added (often as a solution in water, or in a mixture of water and water miscible solvent) to the reaction medium already containing monomer precursor, polymer, and small molecule dopant.

The reaction may be conducted at a convenient temperature, for instance 0-20° C., from 5-20° C., from 10-20° C., from 5-25° C., from 10-30°, or from 15-40° C. In some embodiments, the reaction medium is cooled to a temperature between 0-5° C., the oxidant is then added, and reaction medium is allowed to warm to the temperature specified above. The reaction may be conducted until all the monomer precursor has been consumed. Upon completion, the reaction medium can be evaporated, optionally in the presence of heat, leaving the entangled polymer composition. Prior to evaporation, the reaction mixture can be transferred to a mold to impart a desired shape to the entangle polymer.

When present, the conductive material may be incorporated at a variety of stages in the process. For instance, the conductive material can be dispersed or dissolved in the monomer mixture prior to polymerization. In other embodiments, the conductive material can be dispersed or dissolved in a suitable solvent, and then combined with a solution of the as-form entangled polymer. Preferably the combined materials are agitated for a period of time sufficient to fully disperse the conductive material in the entangled polymers. Suitable means for agitation include stirring and sonication. The resulting material can be mold casted by transferring the mixture to a mold and evaporating the solvents.

Figure 3A:
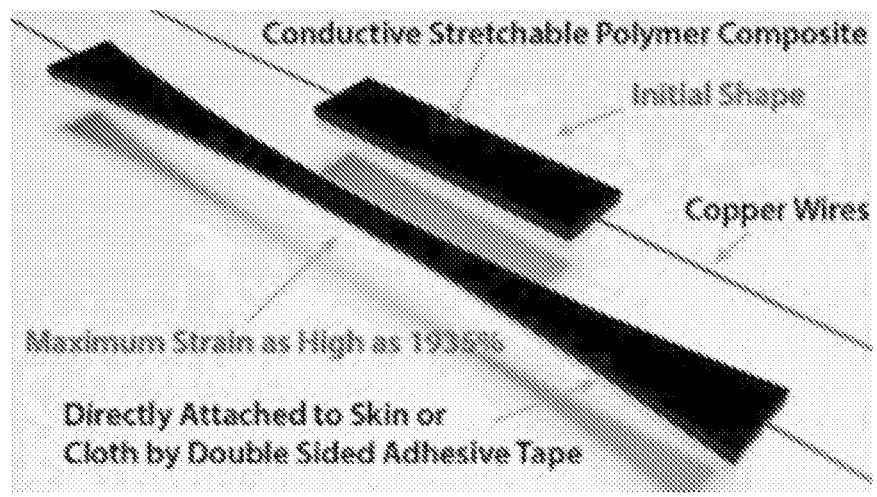
FIG. 3a depicts a schematic diagram of fabricated strain sensor showing extremely high stretchability of a PAAMPSA/PANI/PA electronic material (up to 1,935%).
Figure 3B:
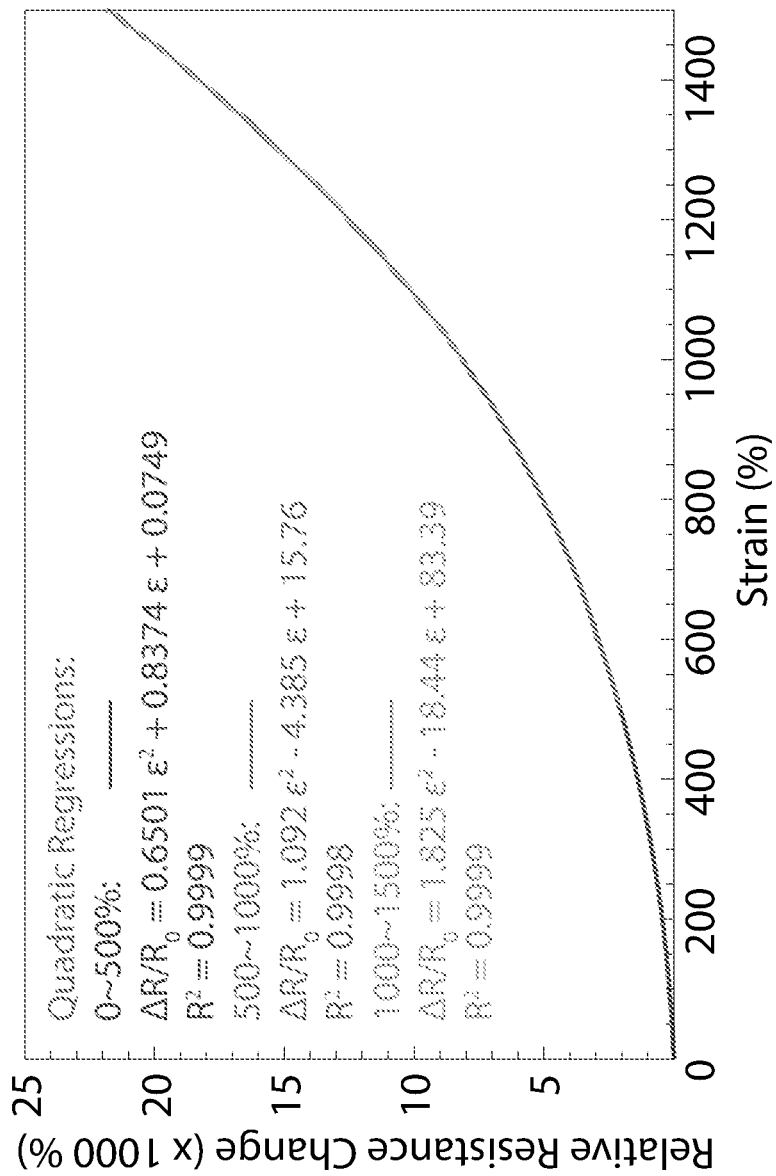
FIG. 3b depicts a plot of $\Delta R/R_0$ versus applied strain for a PAAMPSA/PANI/PA electronic material.

The compositions disclosed herein may be advantageously employed in a variety of different applications. Strain sensor can be fabricated by placing the composition onto a two-sided stretchable adhesive tape substrate (e.g. 3M VHB tape) with both sides connected by insulated copper wires, shown in FIG. 3a. The strain sensor can be directly attached to human skin or clothes as a wearable device. The ultra-high stretchability allows the self-healing strain sensor to remain intact with elongations up to 1935% (FIG. 3b).

Figure 3C:
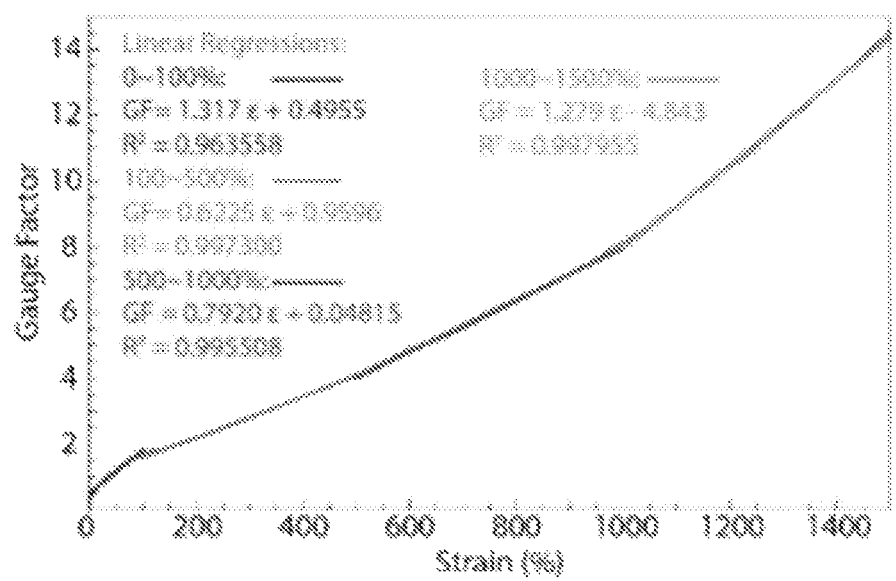
FIG. 3c depicts a plot of GF versus applied strain for a PAAMPSA/PANI/PA electronic material.
Figure 3D:
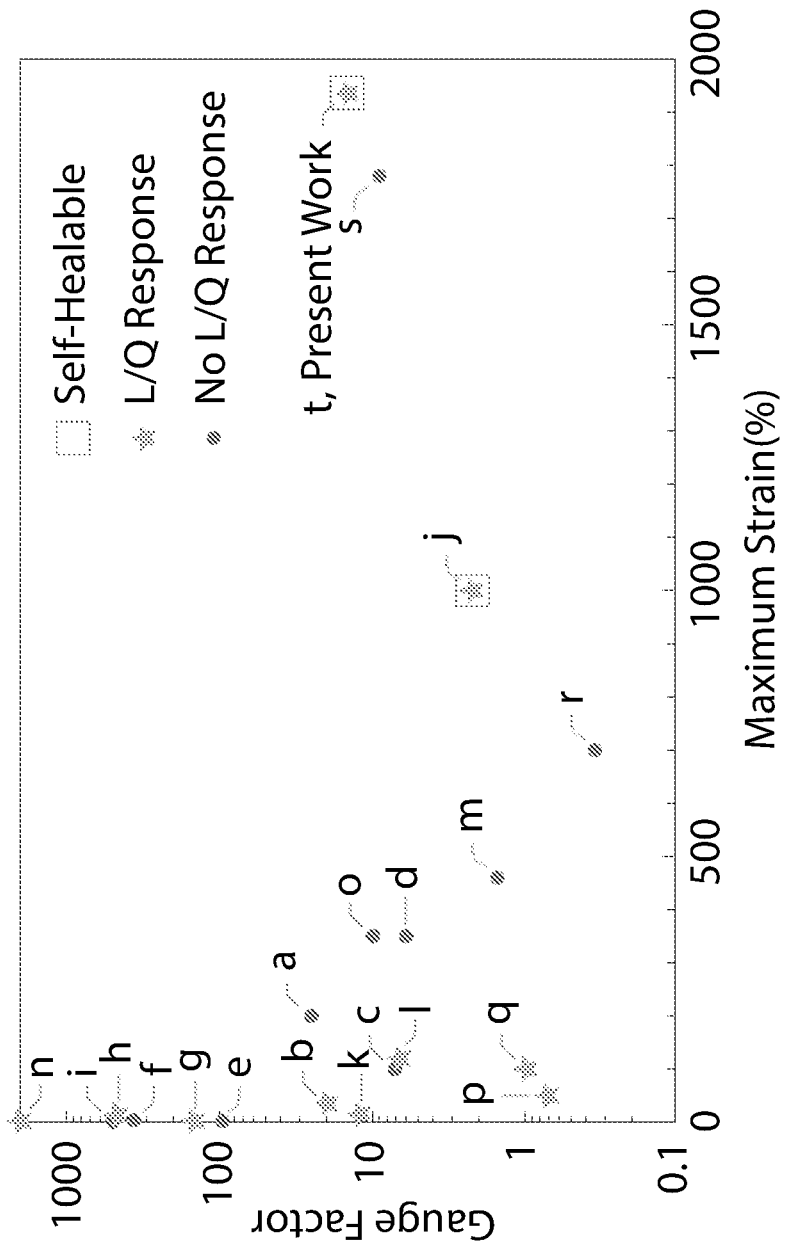
FIG. 3d depicts a comparison of a PAAMPSA/PANI/PA electronic material with recent reported flexible strain sensors in terms of stretchability, GF, linearity, and self-healing ability. References: a~t. Present work: u.

The plot of relative change in resistance $$\left(\frac{\Delta R}{R_0} \times 100\% \text{ or } \frac{R-R_0}{R_0} \times 100\%, R_0\right)$$

as the resistance at 0% strain) versus applied strain perfectly fits three quadratic polynomials (for 0 to 500%, 500 to 1000%, 1000 to 1500%, respectively) with coefficients of determination over 0.99983 (FIG. 3c). Relative change in resistances as large as 21741.1% were observed for the corresponding strain at 1500%. As for gauge factor $$\left(GF = \frac{R-R_0}{\varepsilon \times R_0},\right.$$

a metric representing sensitivity of a strain sensor) versus applied strain, the curve significantly fits four linear lines (0 to 100%, 100 to 500%, 500 to 1000%, and 1000 to 1500%, respectively) with coefficients of determination over 0.9955 for strains over 100% (FIG. 3d). The GF is 1.7 for strain at 100% and 14.52 for strain at 1500%, which is higher than most ultra-stretchable strain sensors to date Although some metallic nanofiller embedded strain sensors exhibit higher GFs, issues including poor stretchability, non-linearity, unidirectional sensing, poor cyclic stability, and lack of self-healing ability greatly restrict their applications. The extremely high linearity with excellent fit of quadratic and linear polynomials at a wide range is highly desirable, as it represents a sensor response with high repeatability, feasibility, and accuracy. Typically, resistive-type strain sensors exhibit poor linearity as they incorporate conductive nanofillers with stretchable microstructures that have non-homogenous morphologies-resulting in non-linearity. The excellent linearity of the compositions also reveals the underlying strain-responsive mechanisms: geometric and piezoresistive effects. Geometric effects dominate the resistance change as the conductor thickness and width decreases, while its length increases under tensile stress. Assuming the material is incompressible and necking deformation is negligible, the deformation of the sensor can be expressed by Eqn. 2.

$$l = (1+\varepsilon)l_0, w = \frac{w_0}{\sqrt{1+\varepsilon}}, t = \frac{t_0}{\sqrt{1+\varepsilon}} \quad (2)$$

Here, $\varepsilon$ is applied longitudinal strain, l the length, w the width, t the material thickness, and $l_0$, $w_0$, $t_0$ are the initial states of those properties. At strain of $\varepsilon$, the electrical resistance (R) is given by Eqn. 3, $$R = \rho \frac{l}{wt} = \frac{\rho}{\rho_0}\left(\rho_0 \frac{l_0}{w_0 t_0}\right)(1+\varepsilon)^2 = \frac{\rho}{\rho_0} R_0 (1+\varepsilon)^2 \quad (3)$$

where $\rho$ is the electrical resistivity. The theoretical relative resistance change $$\left(\frac{\Delta R}{R_0}\right)$$

—with $R_0$ being the resistance at 0% strain—is given by Eqn. 4 and Gauge Factor $$\left(GF = \frac{\Delta R}{\varepsilon R_0}\right)$$

—a metric representing sensitivity—is given by Eqn. 5.

$$\frac{\Delta R}{R_0} = \frac{\rho}{\rho_0}(1+\varepsilon)^2 - 1 = \frac{\rho}{\rho_0}\varepsilon^2 + \frac{2\rho\varepsilon}{\rho_0} + \left(\frac{\rho}{\rho_0} - 1\right) \quad (4)$$

$$GF = \frac{\Delta R}{\varepsilon R_0} = \frac{\rho}{\rho_0}\varepsilon + \frac{2\rho}{\rho_0} + \frac{\left(\frac{\rho}{\rho_0} - 1\right)}{\varepsilon} \quad (5)$$

Figure 3E:
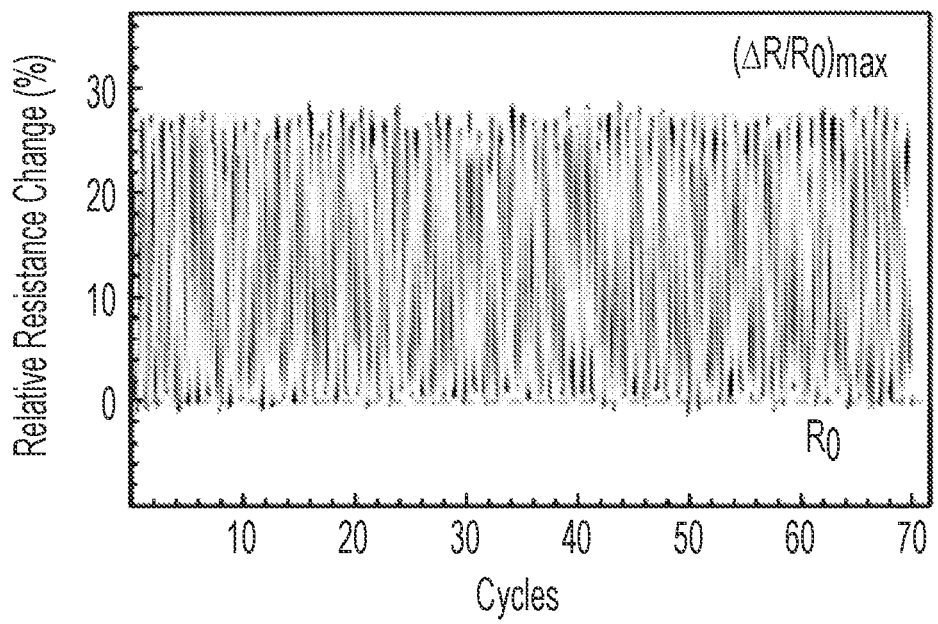
FIG. 3e depicts the cycling stability test of a PAAMPSA/PANI/PA strain sensor: $\Delta R/R_0$ responding to repetition of 70 loading and unloading cycles at 20% strain.
Figure 3F:
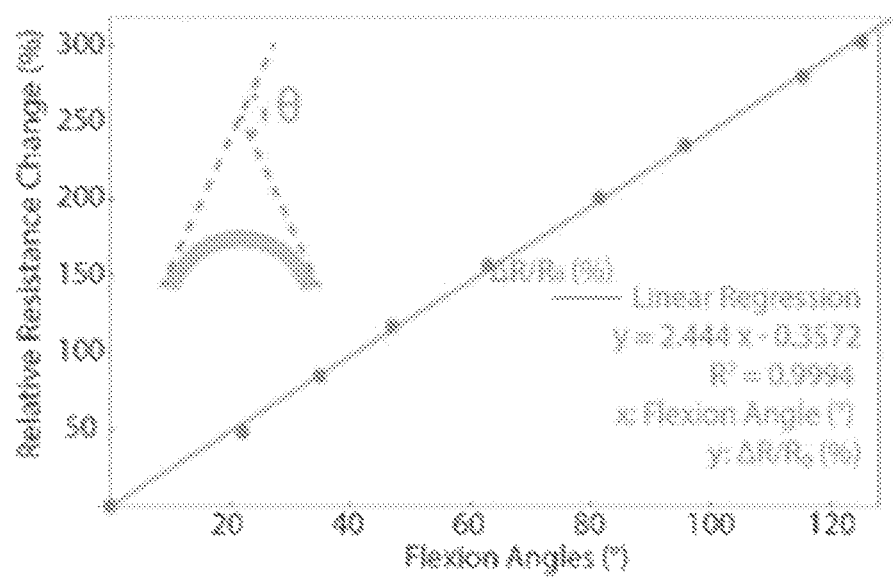
FIG. 3f depicts the plot of $\Delta R/R_0$ versus flexion angles from 0 to 120° for a PAAMPSA/PANI/PA electronic material. The bending radius was 20 mm.
Figure 3G:
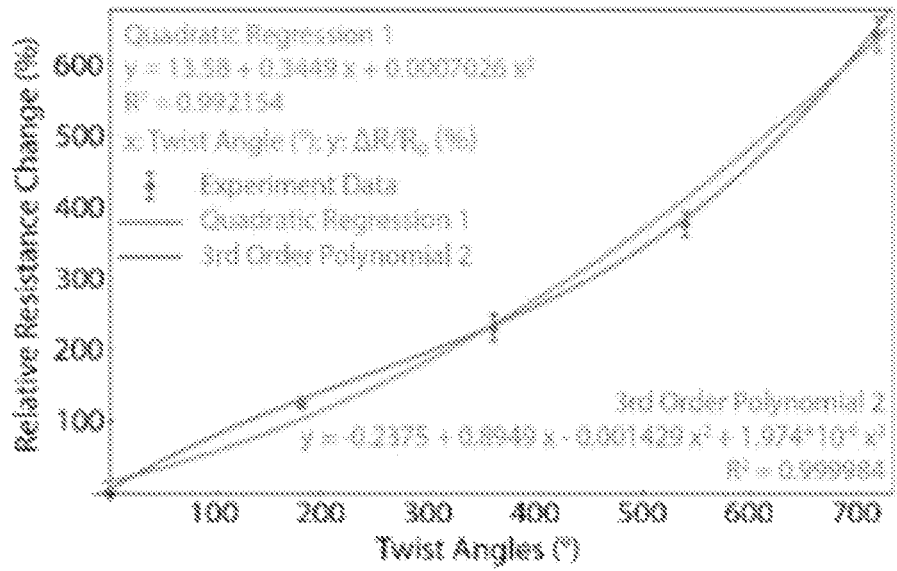
FIG. 3g depicts a plot of $\Delta R/R_0$ versus twist angles from 0 to 720° for a PAAMPSA/PANI/PA electronic material.

The theoretical $\Delta R/R_0$ and GF are in accordance with regression polynomials where $\Delta R/R_0$ follows quadratic polynomials and GF follows linear trend. Note the coefficient of $\rho/\rho_0$ presented in all terms is fractional resistivity change caused by piezoresistive effect which increases as the applied strain increases. Both $\Delta R/R_0$ ($R^2>0.99983$) and GF ($R^2>0.9955$ for E over 100%, under 100% strain, the hyperbola term 1/E is dominant making GF non-linear) shows excellent linearity. $\Delta R/R_0$ responding to a repetition of 70 loading and unloading cycles at 20% strain is shown in FIG. 3e. The sensor resistance returned to baseline values upon relaxation while $(\Delta R/R_0)_{max}$ remained unchanged upon stretching for all cycles-indicating high cyclic stability and reversibility. The sensor response to deformation of flexion and twisting were also investigated. FIG. 3f shows the plot of $\Delta R/R_0$ versus flexion angles (bending radius: 20 mm) from 0 to 120°. The plot of $\Delta R/R_0$ versus time is given in FIG. S8 (Supporting Information). Continuous bending at 9 incremental flexion angles were applied and the recorded resistance change follows a perfect linear line indicating the sensor can easily monitor bending movements with high accuracy and without calibration. This multifunctional strain sensor is subject to severely twisted states up to 720°. Surprisingly, it is flexible enough to be twisted even at 720°, demonstrating its versatility. A plot of $\Delta R/R_0$ versus twist angles from 0 to 720° is shown in FIG. 3g. Unlike flexion angles, the relationship of twisting angles with relative resistance change obeys quadratic or 3rd order polynomials.

Figure 3H:
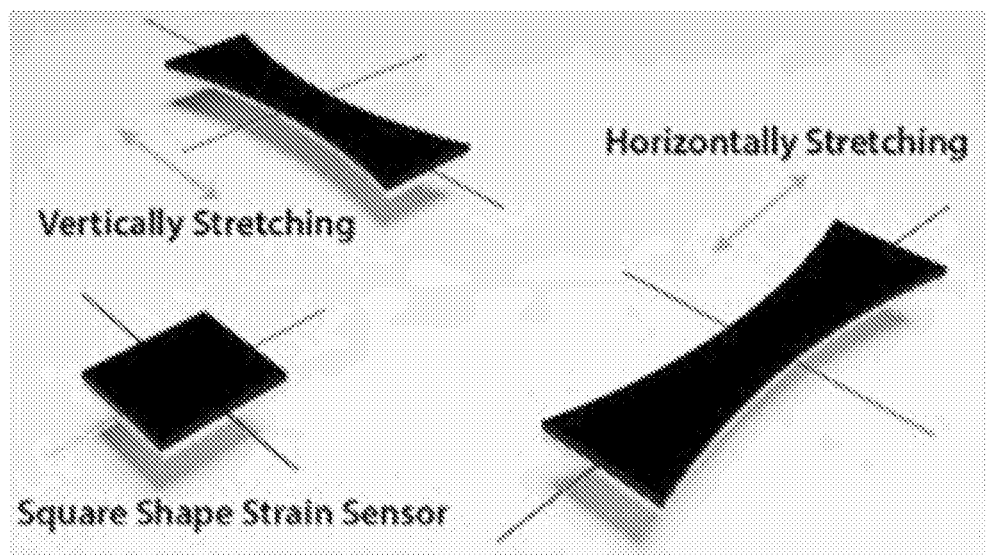
FIG. 3h depicts a schematic diagram demonstrating omni-directional sensing capability of PAAMPSA/PANI/PA strain sensor. A square shaped strain sensor was fabricated and was stretched horizontally and vertically.
Figure 3I:
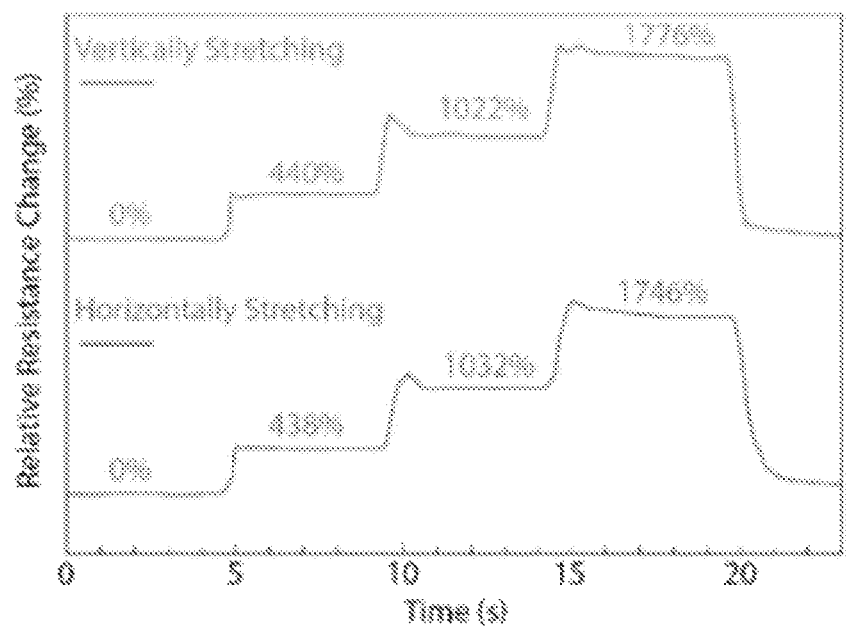
FIG. 3i depicts a plot of $\Delta R/R_0$ versus time with tensile stretching horizontally and vertically for a PAAMPSA/PANI/PA electronic material. Incremental strains at 0%, 200%, 330%, and 460% were applied with a time frame of 5 s.
Figure 4A:
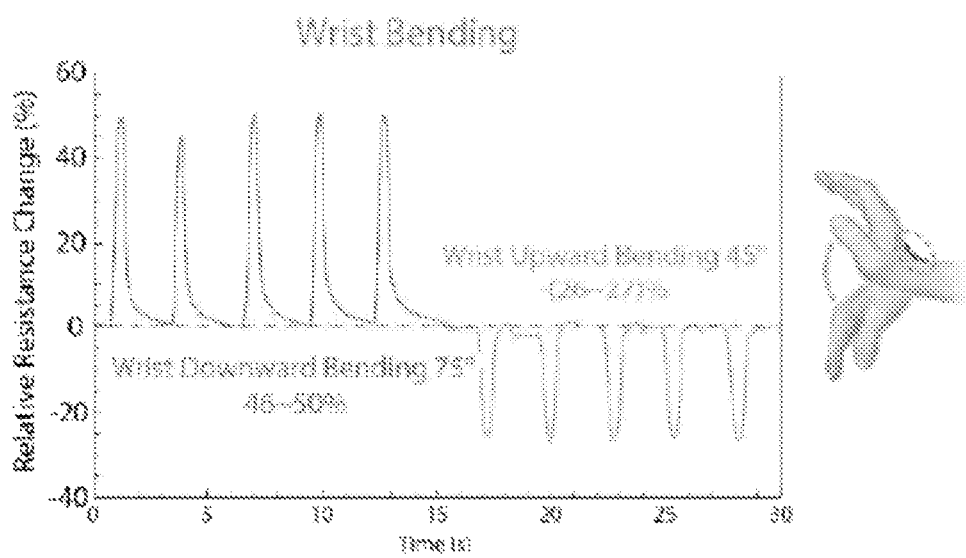
FIG. 4a depicts the $\Delta R/R_0$ vs time for wrist bending 75° downwards and 45° upwards for a PAAMPSA/PANI/PA electronic material.
Figure 4B:
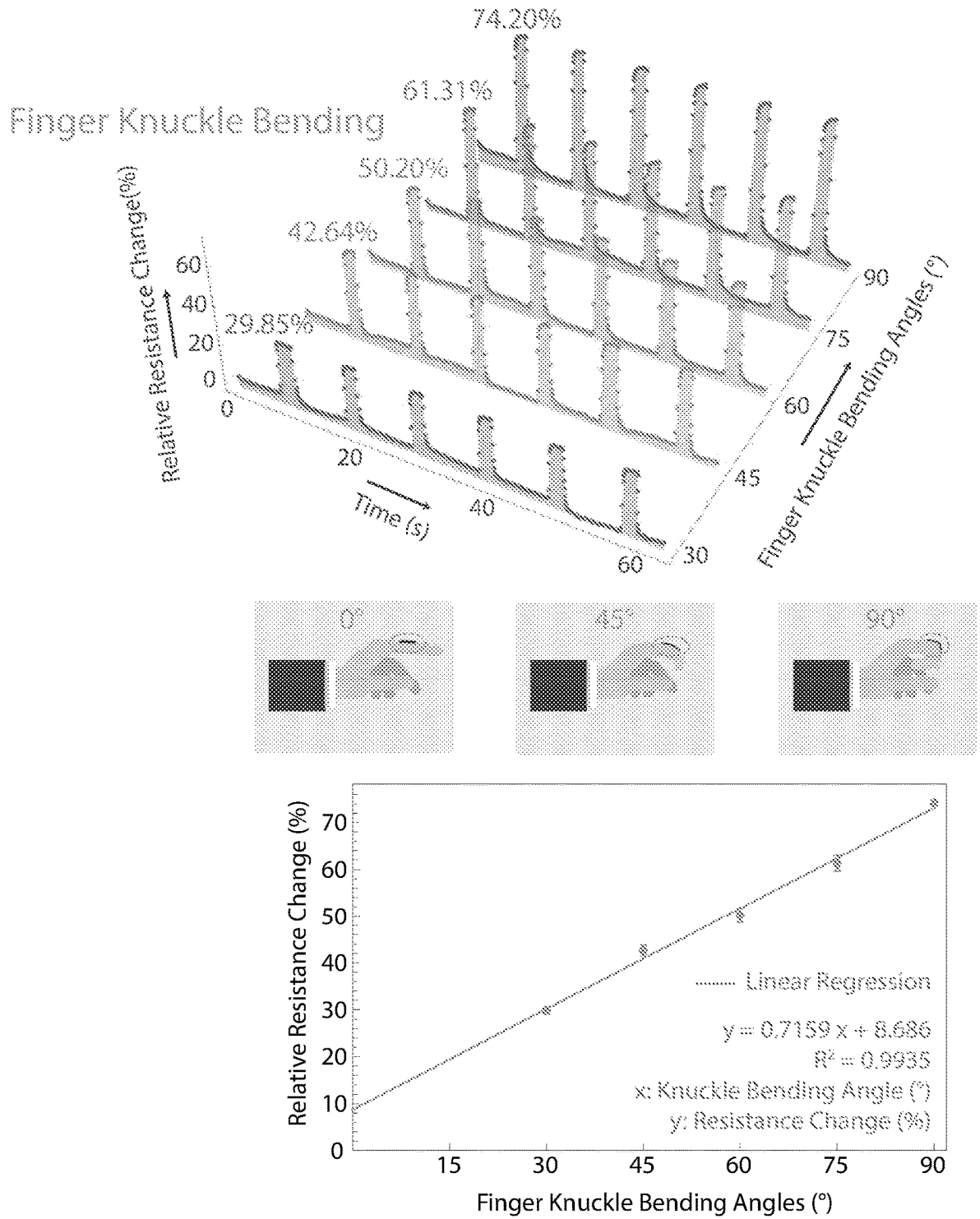
FIG. 4b depicts $\Delta R/R_0$ vs time for finger knuckle bending at angles of 30, 45, 60, 75, 90°.
Figure 4C:
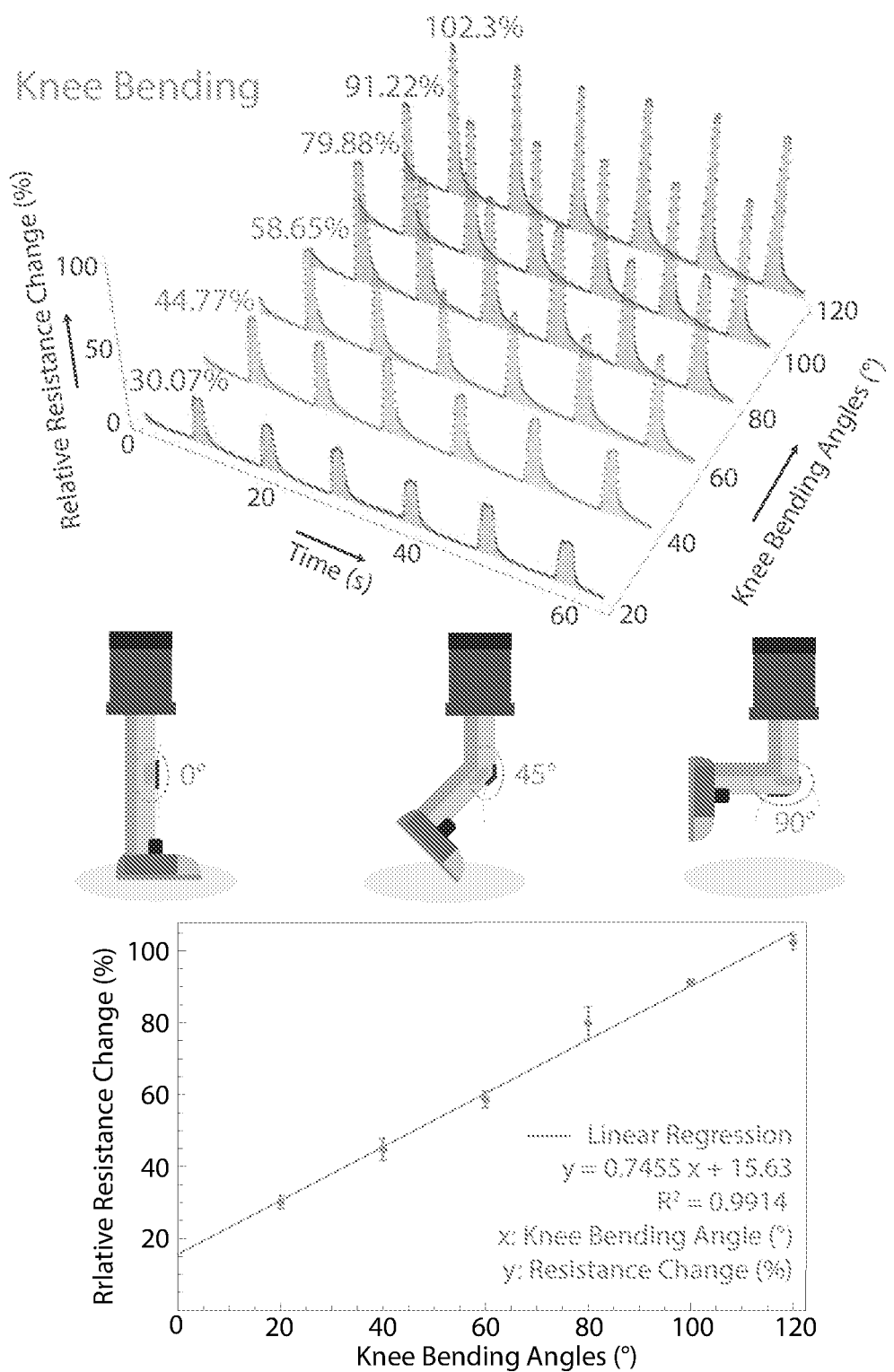
FIG. 4c depicts $\Delta R/R_0$ vs time for knee bending at angles of 20, 40, 60, 80, 100, 120°. In both FIGS. 4b and 4c, bending motions at each angle were performed 6 times with bending duration of 2 seconds and bending motion intervals of 8 seconds. The schematic diagrams of the motions are presented, and the average $\Delta R/R_0$ with their standard errors for all angles are plotted.
Figure 4D:
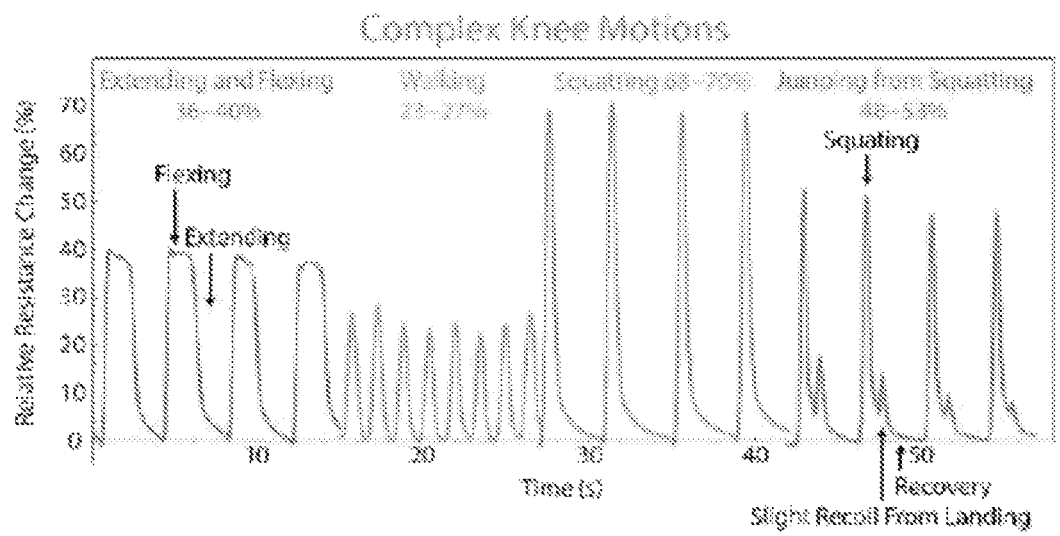
FIG. 4d depicts $\Delta R/R_0$ vs time for complex knee motions including extending and flexing, walking, squatting and jumping from squatting.

For a twist angle of 720°, the resistance change increases up to more than 640%. Another important advantage of the present PAAMPSA/PANI/PA strain sensor is its omni-directional sensing capability. Generally wearable strain sensors are only capable of detecting strain in the direction in which the underlying stretchable network is constructed or conductive nanofillers are aligned (uni-directional). One way to overcome this challenge is by arranging three independent serpentine-shaped sensors at a fixed angle of 120° to build a rosette-type gauge. However, this approach is complicated by the inherent restricted stretchability and complex operation—requires multi-signal reception and processing. Owing to the homogenous nature of the PAAMPSA/PANI/PA material, our strain sensor is responsive in all directions (FIG. 3h, i). A square shaped sensor was prepared then stretched at incremental strains of 0%, 200%, 330%, and 460% horizontally and vertically. The recorded relative resistance change for ultra-high strains is nearly indistinguishable in either direction, with a difference below 2%.

To demonstrate the potential of the PAAMPSA/PANI/PA strain sensor as a wearable for human motion detection, the fabricated strain sensor was directly attached onto the skin of various body parts including wrist, finger knuckle, knee and elbow (FIG. 4). The soft nature, due to elastic modulus, close to human skin helps in performing comfortable motions without restriction. Additionally, further advantage of the inventive composition are their negligible resistance drift after completed motions. The relative change in resistance versus time for wrist bending 75° downwards and 45° upwards (motion time interval: 3 s) is shown in FIG. 4a. The sensor response is shown to be fast, stable, and consistent. It is worth noting that our sensor is not only able to detect the human motion, but also able to distinguish the direction and magnitude of human motion. Here, downward bending stretches the sensor—returning a higher resistance—while upward bending contracts the sensor—decreasing the conductive pathway and yielding a lower resistance. FIG. 4b shows the finger knuckle bending detection by placing the sensor at the proximal interphalangeal joint of the index finger as illustrated. Bending at various angles was performed six times with a bending duration of 2 s and bending motion intervals of 8 s. The $\Delta R/R_0$ increased with increasing bending angles: 29.85%, 42.64%, 50.20%, 61.31% and 74.20% for bending angles of 30, 45, 60, 75 and 90°, respectively. The resistance change is sufficiently high to correlate the response with bending, in a reliable manner. Importantly, the sensor's response is instantaneous and the sensor is capable of detecting bending angles of a finger knuckle with excellent linearity. The coefficient of determination is shown to be 0.9935 with extremely low standard deviations (±1.066% for all bending angles) indicating that the sensor can accurately monitor the extent and frequency of human finger motion in real time. To be able to accurately detect large scale human motions, a larger strain sensor was prepared to cover extended areas of skin on a knee joint as illustrated in FIG. 4c. The $\Delta R/R_0$ is shown to be 30.07%, 44.77%, 58.65%, 79.88%, 91.22% and 102.32% for knee bending angles of 20, 40, 60, 80, 100 and 120°, respectively. Similar to the finger knuckle motion detection, the sensor is capable of accurately detecting bending motions of knee joints with excellent linearity ($R^2=0.9914$). The same trend is observed in elbow bending detection in FIG. S9. The present strain sensor can detect and discriminate a number of complex motions, as shown in FIG. 4d. The motions of extending and flexing ($\Delta R/R_0=36~40\%$), walking ($\Delta R/R_0=23~27\%$), and squatting ($\Delta R/R_0=68~70\%$) each have their own characteristic signal intensity and frequency. Relative resistance changes are proportional to the extension and intensity of all motions. For sequential motions such as jumping from squatting, an intensive peak corresponding to squatting was detected followed by a moderate peak caused by slight flexure from landing on the ground. Finally the change in resistance reaches a baseline value, due to recovery to standing upright position.

EXAMPLES

The following examples are for the purpose of illustration of the invention only and are not intended to limit the scope of the present invention in any manner whatsoever.

Example 1: Strain Sensor

Preparation of PAAMPSA/PANI/PA Conductive Polymer Material:

The polymer mixture solution was prepared by mixing 50 g PAAMPSA solution (average molecular weight 800,000, 10 wt. % in water, Acros Organics), 2.5 g PA solution (50 wt. % in water, Acros Organics) and 0.5 g aniline (Sigma-Aldrich). Later 0.685 g APS was dissolved in 2.5 g DI water then added into polymer mixture solution to initiate in situ polymerization of PANI. The polymer mixture solution was magnetically stirred at 0° C. in water bath for first 3 hours and kept stirring at 20° C. for another 20 hours. The conductive polymer film was finally formed through solvent casting method by pouring the mixture solution into a 50 mL PTFE evaporating dish at 30° C. for 24 hours to evaporate the excess water. The PAAMPSA/PA film was also prepared as control sample by mixing 50 g PAAMPSA and 3 g PA solution for 3 hours followed by the same solvent casting procedure.

Fabrication of Strain Sensor:

The strain sensor was fabricated by first cutting PAAMPSA/PANI/PA conductive polymer film into rectangular pieces with a fixed size of 40 mm*10 mm*0.9 mm. A commercial transparent double-sided adhesive tape (3M VHB-4910 Tape) was used as encapsulant and adhesive substrate which can be mounted onto skin or clothes. The rectangular material strip was connected with electric wires on both sides and carefully placed onto VHB tape and waited for 24 hours to achieve ultimate bonding strength between VHB tape and material strip. A fully encapsulated strain sensor was also fabricated by encapsulate both sides of material strip with VHB tapes.

Characterization of PAAMPSA/PANI/PA Conductive Polymer Material:

Thermal gravimetric analysis (TGA) and differential scanning calorimetry analysis (DSC) were performed on Simultaneous Thermal Analyzer 8000 (PerkinElmer Inc.) by heating up from 30° C. to 820° C. in $N_2$ atmosphere. The heating rate was set as 10° C./min. FT-IR spectra with a range between 700 to 4000 $cm^{-1}$ was collected by Nicolet iS50 (Thermo Fisher Scientific Inc.) FT-IR Spectrometer in the transmission model with 32 scans and a resolution of 4 $cm^{-1}$. SEM and EDS mapping were performed on JEOL 7000 FE SEM. Sample was vacuum dried by a turbo pump for 24 hours prior to image. Optical images for self-healing progression were token by Zeiss Axio Lab.A1 microscope. Zeta potential of polymer dispersions was collected on Zetasizer Nano ZS (Malvern Panalytical). The electrical conductivity of the conductive PAAMPSA/PANI/PA film was measured using a standard four-point probe method at room temperature using Keithley 2450 source meter. Tensile tests were completed using a universal tensile tester (MTS QTest 25). The sample strip was held by pneumatic grips at 20 psi to prevent slipping during stretching process. The gauge length was set as 20 mm while the strain rate was 8 mm/min.

Sensor Characterization and Body Motion Detections:

All the relative resistance changes were measured using Keithley 2450 source meter. For stretching test, the sensors were fixed on home-built stretching stages to apply the different strains. For flexion angle test, the sensor was attached on a digital protractor with a fixed bending radius of 20 mm and monitored resistance change at different flexion angles. For twisting angle test, the strain sensor was held and twisted by hand at four twisted angles of 180°, 360°, 540° and 720°. For body motion detections, strain sensor was attached to clothes or directly on human skin at different body parts (elbow, wrist, knee, finger knuckle, etc.) with both ends wrapped by commercial medical adhesive tapes and various body motions were performed.

Example 2: Strain Sensor Containing Conductive Metal

Preparation of PAAMPSA/PANI/PA/AgNWs Nanocomposites:

The polymer mixture solution was first prepared by mixing three compounds for 10 minutes: 50 g poly(2-acrylamido-2-methyl-1-propanesulfonic acid) (PAAMPSA) solution (MW~800,000, 10 wt. % in water, Acros Organics), 2.5 g phytic acid (PA) solution (50 wt. % in water, Acros Organics), and 0.5 g aniline (ACS reagent, ≥99.5%, Sigma-Aldrich). Subsequently, 3.158 g of 21.51 wt. % ammonium persulfate (APS) (ACS reagent, ≥98%, Sigma-Aldrich) aqueous solution was introduced into the polymer mixture solution to initiate the free-radical polymerization of aniline. The reaction was carried under magnetic stirring at 0~5° C. in water bath for first 3 hours and kept stirring at ~20° C. for an additional 20 hours to ensure the monomers were fully polymerized. 10 mL silver nanowires (AgNWs) ethanol solution (20 mg/ml, Average Wires Diameter: 60 nm, ACS Materials) was ultrasonic treated for 1 hour. The prepared (PAAMPSA/PANI/PA solution and the 10 mL silver nanowires (AgNWs) ethanol solution were mixed for 2 hours to fully disperse the AgNWs in polymer complex. The surface ultra-sensitive PAAMPSA/PANI/PA/AgNWs film was mold casted by pouring the aforementioned solution into a PTFE mold at 50 C for 5 hours to evaporate the solvent water and ethanol. The film was placed under room temperature overnight prior to the assembly into the wearable device, and tests.

Figure 5:
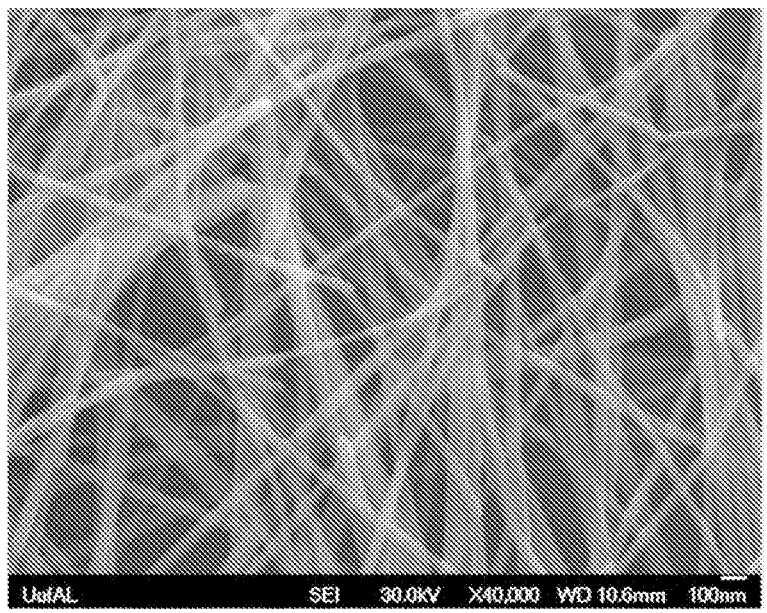
FIG. 5 depicts a SEM micrograph of the pure silver nanowires (AgNW).
Figure 6:
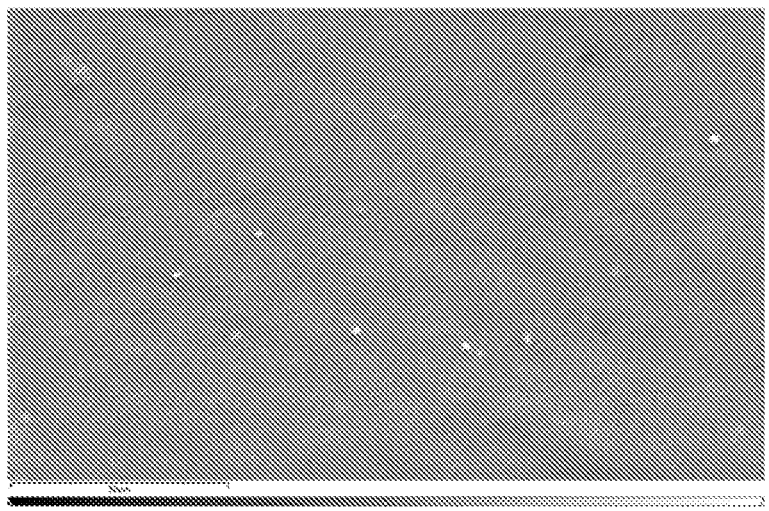
FIG. 6 depicts a SEM micrograph of the PAAMPSA/PANI/PA/AgNWs surface.
Figure 7:
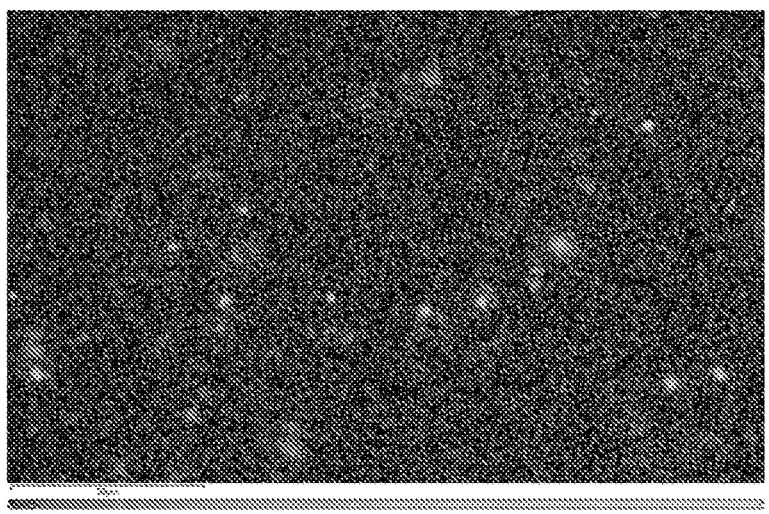
FIG. 7 depicts EDS elemental mapping (Ag) of the PAAMPSA/PANI/PA/AgNWs surface.
Figure 8:
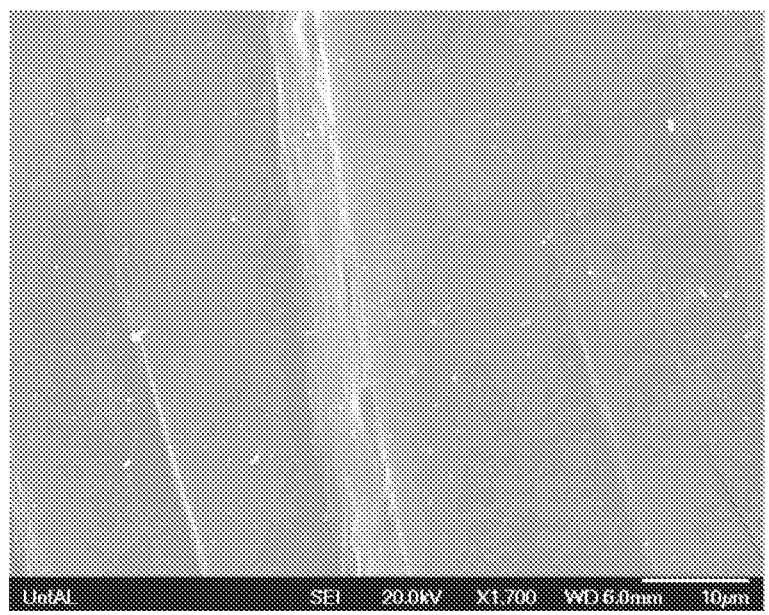
FIG. 8 depicts a SEM micrograph of the PAAMPSA/PANI/PA/AgNWs cross-section.

The morphology of PAAMPSA/PANI/PA/AgNWs and the nanofiller dispersion are investigated by the scanning electron microscope (SEM) imaging (the surface and cross-section) and the energy-dispersive X-ray spectroscopy (EDS) elemental mapping. FIG. 5 shows the morphology of the pristine AgNWs. The size of nanowires is uniform with an average diameter around 60 nm. FIGS. 6 & 7 show the SEM and EDS of the PAAMPSA/PANI/PA/AgNWs surface at the same spot. The white spots on the nanocomposite surface is confirmed to be the wire edges of AgNWs by the EDS mapping. The uniform dispersion of AgNWs in polymer complex matrix is revealed by the cross-sectional SEM micrograph (FIG. 8) demonstrating that there is no aggregation of AgNWs in the nanocomposite. The reasons for the uniform dispersion are partially due to the electrostatic attraction between the PAAMPSA/PANI/PA and AgNWs, and the residual small amount of the stabilizing agent Polyvinylpyrrolidone (PVP) inhibiting the AgNWs aggregation.

Figure 9A:
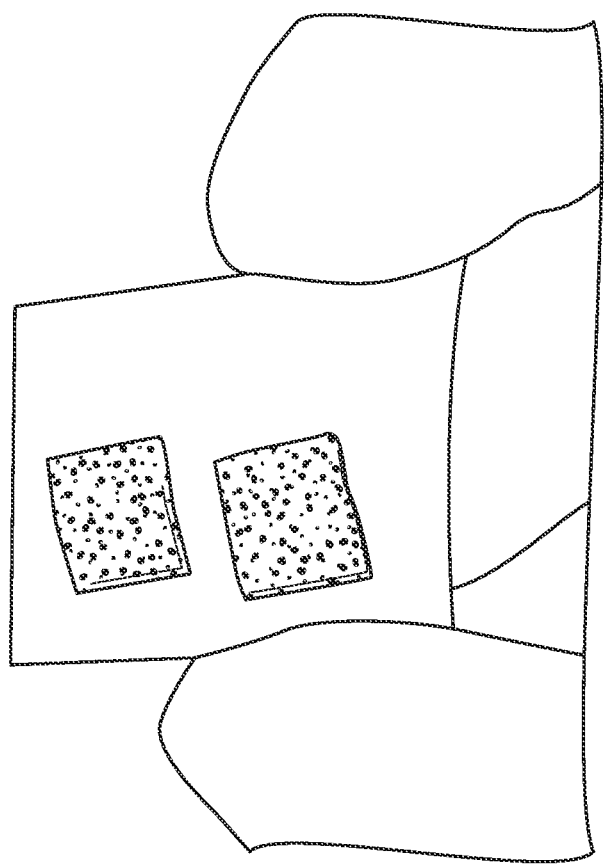
FIG. 9a depicts a small piece of PAAMPSA/PANI/PA/AgNWs film that was sliced into two pieces.
Figure 9B:
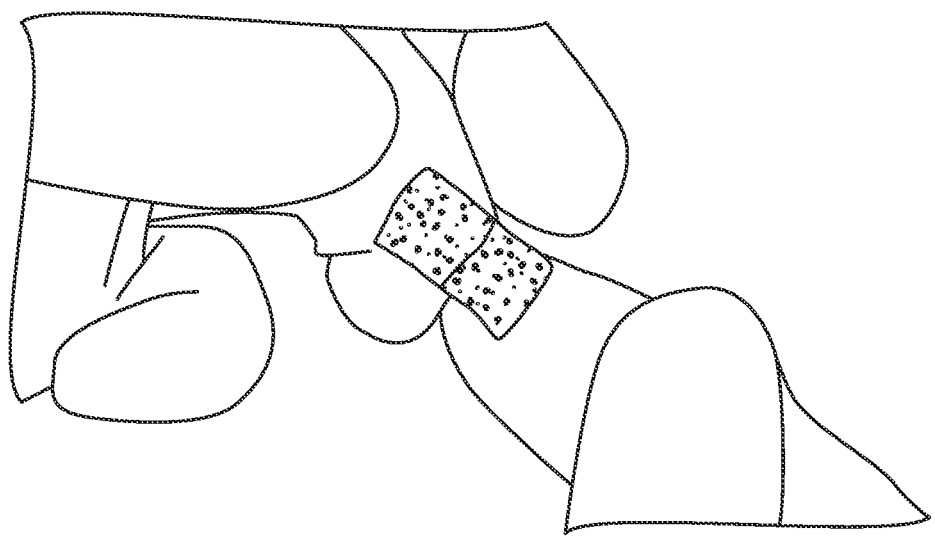
FIG. 9b depicts the same pieces after self-healing.
Figure 9C:
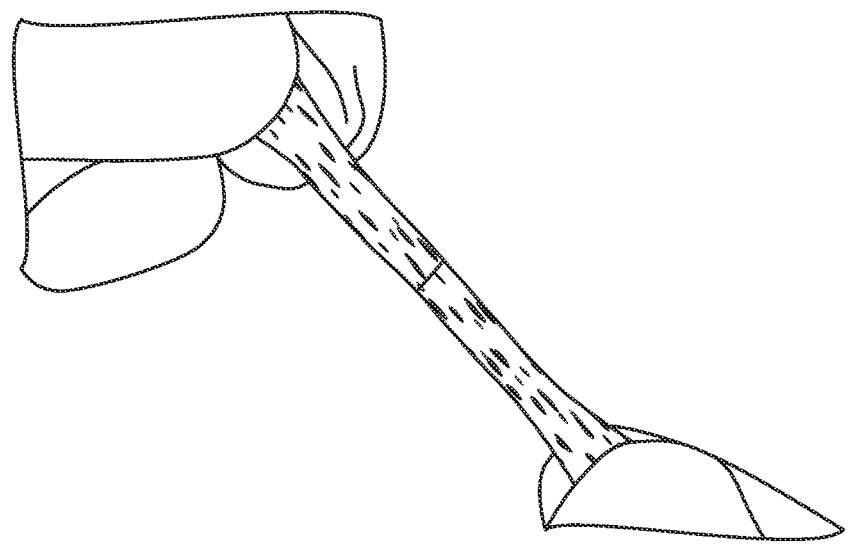
FIG. 9c depicts the self-healed film can sustain extreme elongation.

Like the pristine PAAMPSA/PANI/PA electronic materials, the PAAMPSA/PANI/PA/AgNWs composite has an excellent self-healing ability as well. A small piece of PAAMPSA/PANI/PA/AgNWs film was sliced into two pieces as shown in FIG. 9a. By placing back two severed pieces back having two surfaces contacted each other, the autonomous self-healing process was initiated (FIG. 9b). After self-healing, the film was able to sustain an extreme elongation without rupturing (FIG. 9c).

Figure 10:
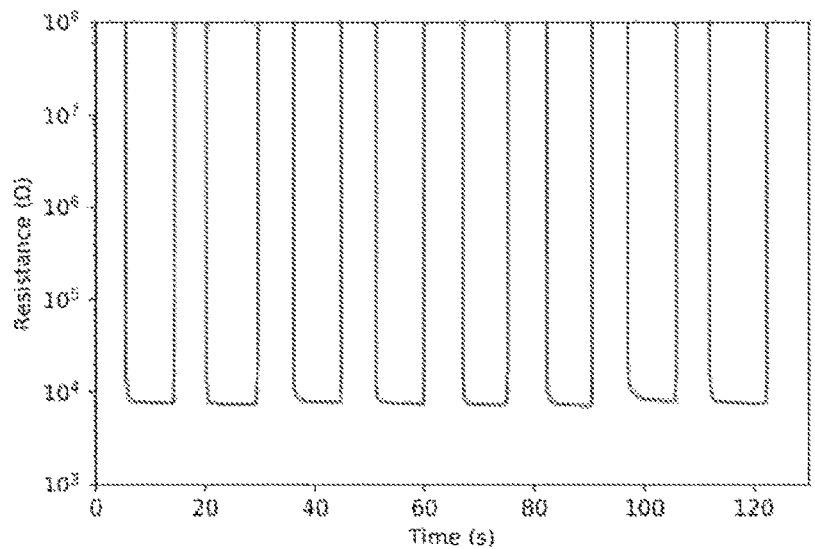
FIG. 10 depicts the electrical resistance of PAAMPSA/PANI/PA/AgNWs materials during 8 Cut-Connect cycles.

The self-healing performance was evaluated based on electrical conductivity by conducting repetitive cut-connect cycles. The film was first cut into two pieces as previously mentioned. For one cut-connect cycle, two severed pieces were kept separated for 5 seconds, then were brought into connection for 10 seconds. FIG. 10 shows the electrical resistance of PAAMPSA/PANI/PA/AgNWs materials during 8 Cut-Connect cycles. The resistance was infinite when two severed pieces were separated. When connected, the electrical conductivity was nearly instantly resumed. Moreover, the self-healing behavior is repeatable without degradation.

Figure 11:
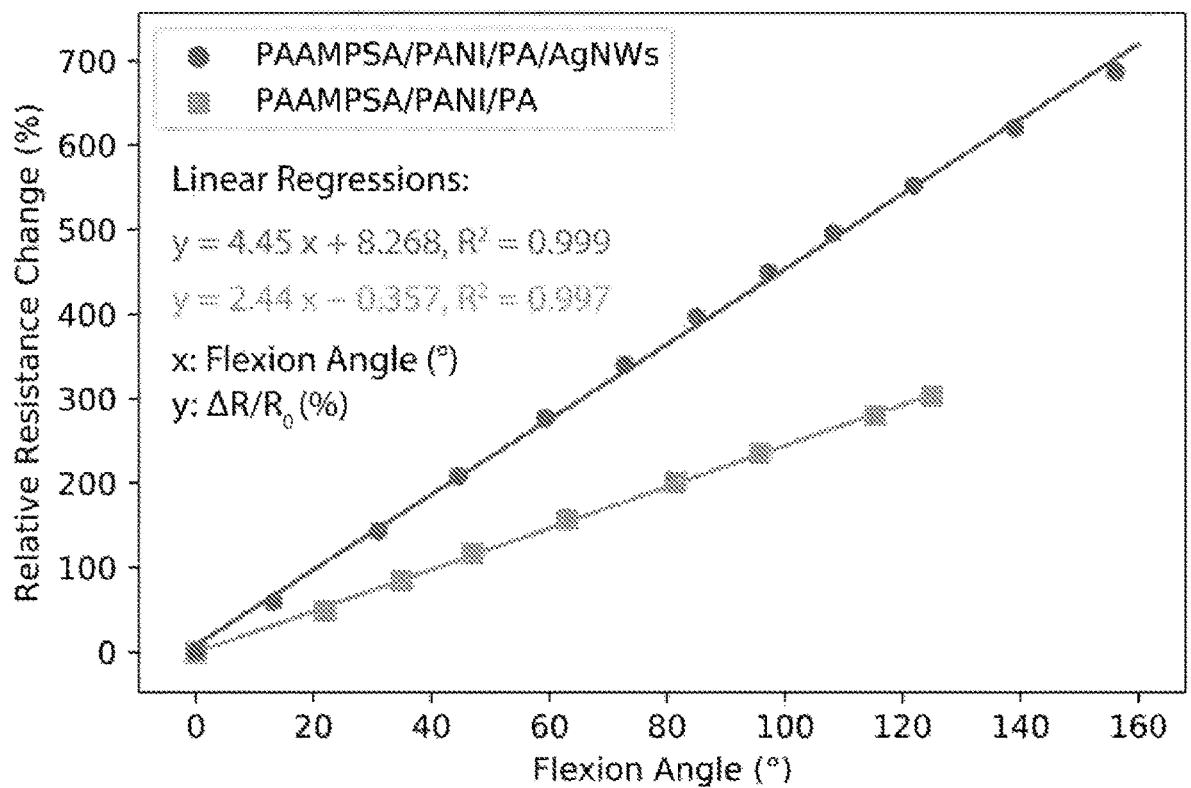
FIG. 11 depicts plots of $\Delta R/R_0$ versus flexion angles for PAAMPSA/PANI/PA/AgNWs from 0 to 156°, and PAAMPSA/PANI/PA from 0 to 125°.
Figure 12:
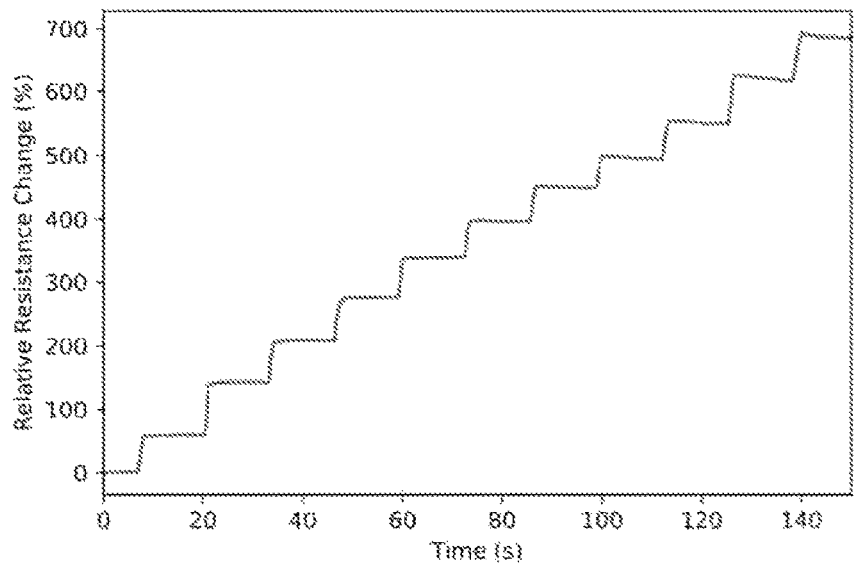
FIG. 12 depicts a plot of $\Delta R/R_0$ versus time for PAAMPSA/PANI/PA/AgNWs with flexion angles from 0 to 156° in 11 incremental steps.

The PAAMPSA/PANI/PA/AgNWs can be assemble into the wearable strain sensor, and its sensing performance is partially characterized and compared with the wearable strain sensor based on pure PAAMPSA/PANI/PA. FIG. 11 shows the plots of $\Delta R/R_0$ versus flexion angles for PAAMPSA/PANI/PA/AgNWs from 0 to 156°, and PAAMPSA/PANI/PA from 0 to 125°. Plot of $\Delta R/R_0$ versus time for PAAMPSA/PANI/PA/AgNWs with flexion angles from 0 to 156° in 11 incremental steps is shown in FIG. 12. It is surprising that the linearity of PAAMPSA/PANI/PA/AgNWs sensor ($R^2=0.999$) is higher than the PAAMPSA/PANI/PA sensor ($R^2=0.997$), as the electromechanical response of PAAMPSA/PANI/PA sensor to the flexion angle is already extremely high. Moreover, the range of linearity is wider (max angle: 156° over 125°), and the sensitivity is higher (slope of regression model: 4.45 over 2.44).

Figure 13:
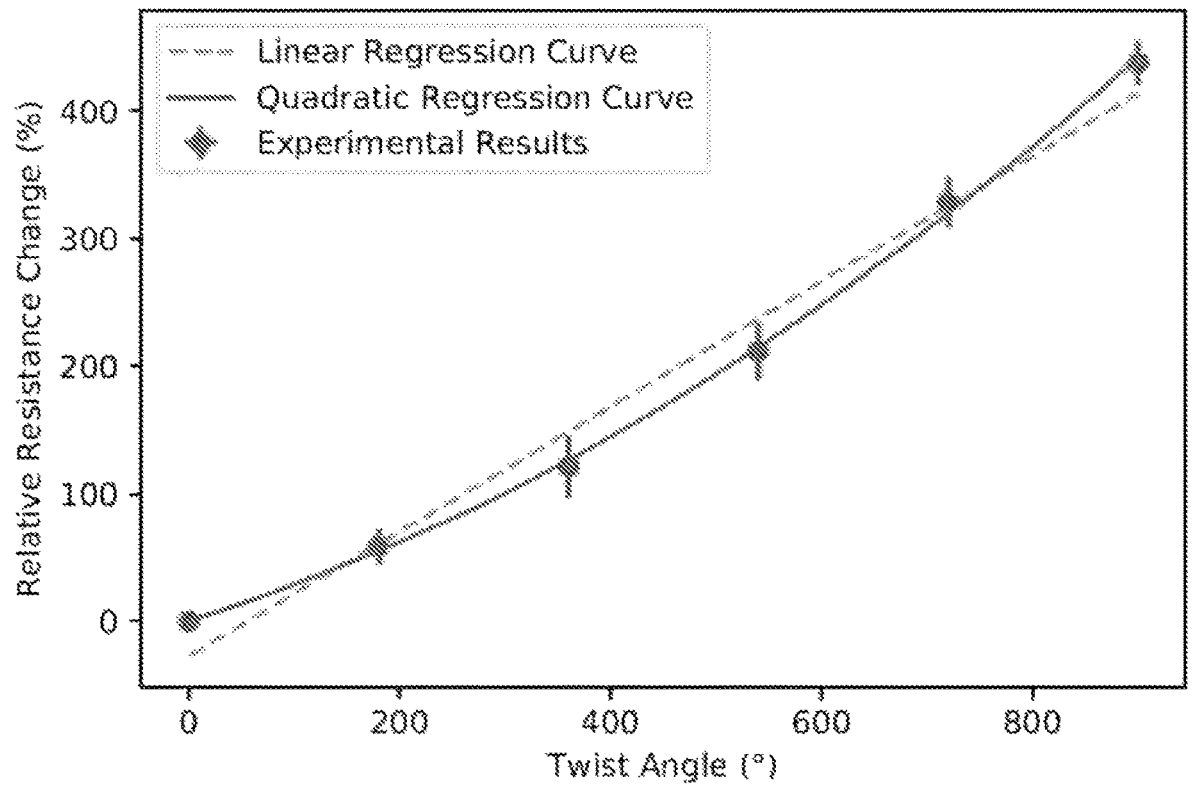
FIG. 13 depicts a plot of $\Delta R/R_0$ versus time for PAAMPSA/PANI/PA/AgNWs with flexion angles from 0 to 156° in 11 incremental steps.

In terms of twisting deformation, the PAAMPSA/PANI/PA/AgNWs sensor shows a similar behavior with the PAAMPSA/PANI/PA sensor (FIG. 13). The responses of both sensors to the twisting deformation are observed to be quadratic rather than linear:

Linear: y=0.490 x−28.0, $R^2=0.980$
Quadratic: y=0.000256 $x^2$+0.260 x−0.289, $R^2=0.999$ As PAAMPSA/PANI/PA/AgNWs is softer than PAAMPSA/PANI/PA, the $\Delta R/R_0$ change of PAAMPSA/PANI/PA/AgNWs sensor is half of that in PAAMPSA/PANI/PA sensor. This demonstrates that the PAAMPSA/PANI/PA/AgNWs sensor is more sensitive in terms of flexion bending, however, not as sensitive in twisting.

Figure 14:
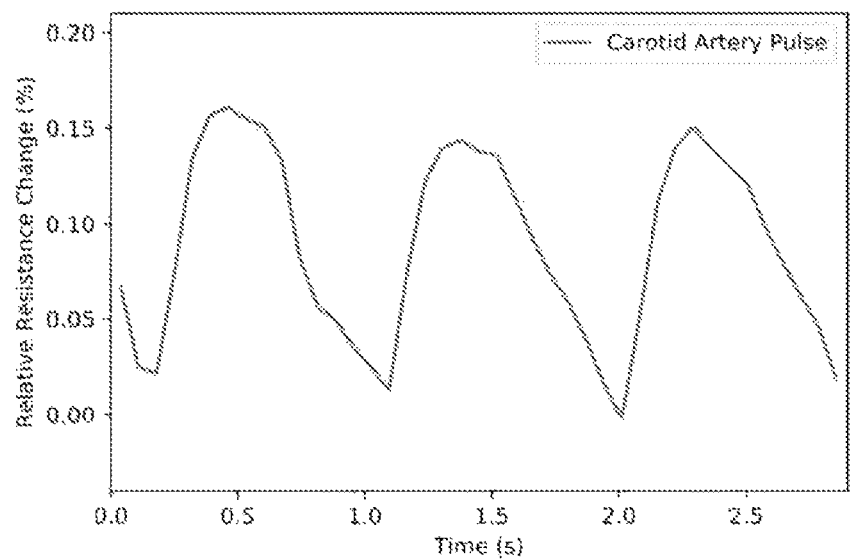
FIG. 14 depicts that a carotid artery pulse can be monitored by the PAAMPSA/PANI/PA/AgNWs wearable sensor.
Figure 15:
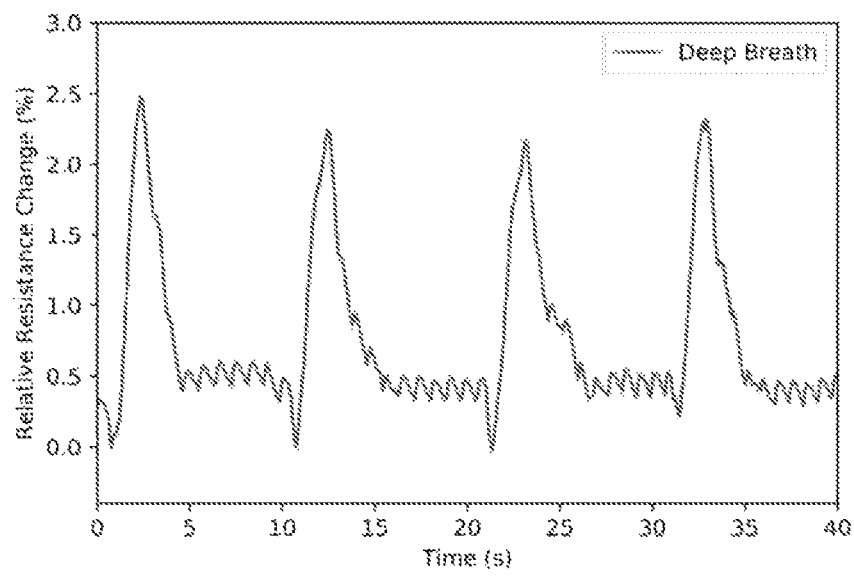
FIG. 15 depicts deep breathing (diaphragmatic breathing) monitored by the PAAMPSA/PANI/PA/AgNWs wearable sensor.

Compared to the pure PAAMPSA/PANI/PA strain sensor, the PAAMPSA/PANI/PA/AgNWs wearable sensor is found to be more surface sensitive. It is able to sense the delicate changes in deformations. FIG. 14 shows the PAAMPSA/PANI/PA/AgNWs wearable sensor is able to successfully monitor the carotid artery pulse when the sensor is worn near the surface of the body at the neck. Based on the monitored frequency, pulse of the wearer is found to be around 75 times per minute which is consistent with the results tested by other sophisticated methods. The typical characteristics of human pulses with three waves: main wave or superior wave, predicrotic wave, and dicrotic wave are all successfully recorded in a single pulse wave by the PAAMPSA/PANI/PA/AgNWs wearable sensor. FIG. 14 shows the electrical resistance change of the sensor with regard to the deep breathing (or diaphragmatic breathing). It is clear that the deep breathing will cause a greater extent of neck motion than the carotid artery pulse. The intensity of deep breathing is about 15 times of that of the carotid artery pulse based on the monitored signal. The small waves on the right shoulder of the deep breathing peak is believed to be the periodic pulse as well.

Figure 16:
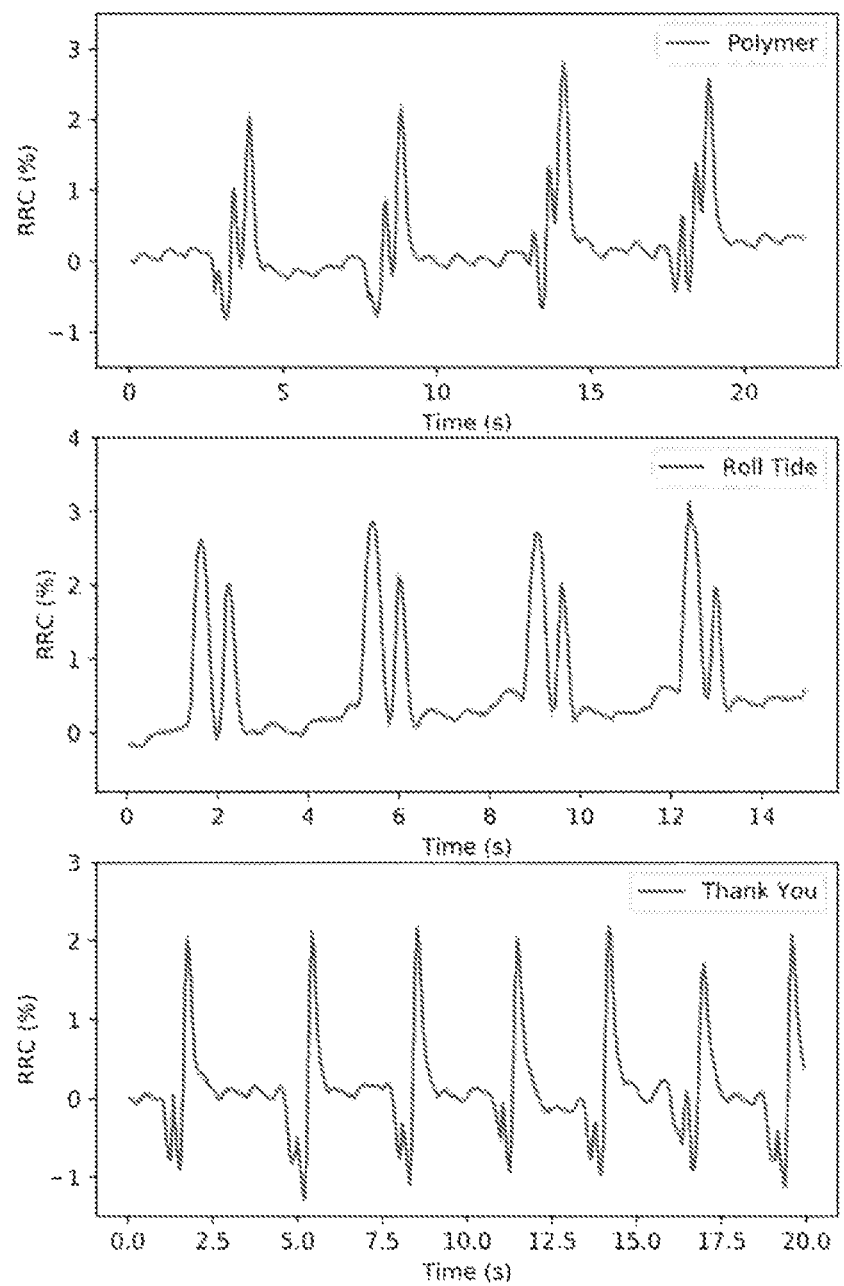
FIG. 16 depicts the detection of different words using PAAMPSA/PANI/PA/AgNWs wearable sensor. (RRC % means relative resistance change in %): "polymer" (top panel); "roll tide" (middle panel), "thank You" (bottom panel).

Benefiting from the surface sensitive feature of the PAAMPSA/PANI/PA/AgNWs wearable sensor, it has the potential to discern the human speeches. The sensor was mounted on the throat area, and a volunteer pronounced different words to test if the sensor was able to capture the occurrence of different words and differentiate these words by their signal patterns. FIG. 16 shows the recorded resistance change of PAAMPSA/PANI/PA/AgNWs wearable when different words were pronounced. The responses are clear, and the patterns are distinct due to different syllables composing a word. This suggests that the material can serve as a speech sensor.

Figure 17:
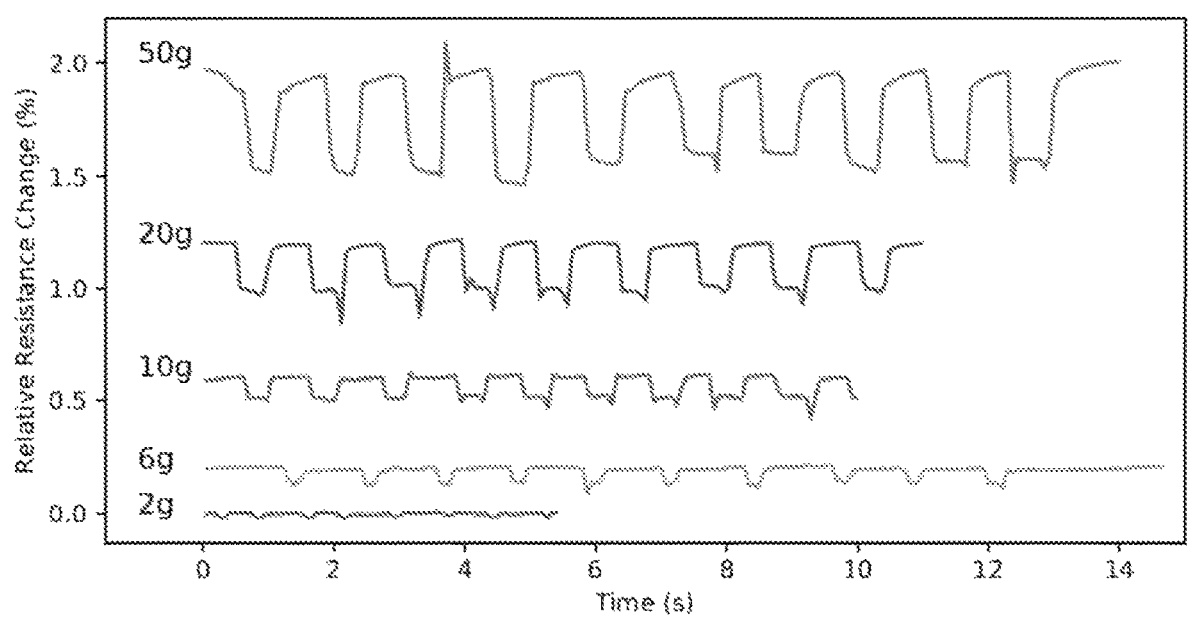
FIG. 17 depicts a plot of relative resistance changes versus time for the PAAMPSA/PANI/PA/AgNWs wearable sensor when various forces or pressures (50 g, 20 g, 10 g, 6 g, 2 g) were applied on the top surface of the sensor.

Finally, the PAAMPSA/PANI/PA/AgNWs sensor with an excellent sensitivity is tested its ability to sense the light pressure. Different standard weights and small objects (50 g, 20 g, 10 g, 6 g, 2 g) were gently placed on the top surface of the sensor to apply the pressure, then gently lifted the objects to release the pressure, back and forth for several times. The applied pressure/force can be successfully monitored by the PAAMPSA/PANI/PA/AgNWs sensor, even with the very lightweight object (2 g) as shown in FIG. 17. This means that even an ultralight pressure or force (75 Pa or 0.02 N), the signal of the applied event can be recorded by the wearable sensor.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

What is claimed is:

1. A flexible, self-healing, conductive composition comprising: at least one conductive polymer entangled with at least one acidic polyacrylamide, and at least one small molecule dopant comprising from 2-10 acidic groups, wherein the acidic polyacrylamide comprises a repeating unit of Formula (1):

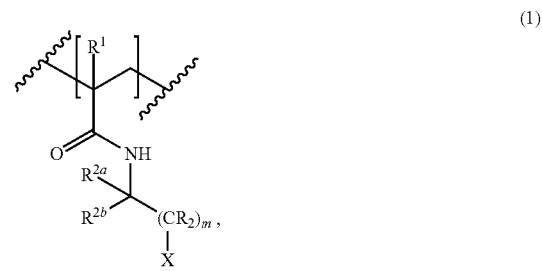

wherein:
$R^1$ is selected from hydrogen and methyl;
$R^{2a}$ and $R^{2b}$ are independently selected from hydrogen, $C_{1-4}$alkyl, wherein $R^{2a}$ and $R^{2b}$ may together from a ring;
R is in each case independently selected from H, F, Cl, $C_{1-4}$alkyl or $OCC_{1-4}$alkyl;
m is selected from 1, 2, 3, 4, 5, or 6; and
X is —$SO_3H$, —$PO_3H$, or —COOH.

2. The conductive composition according to claim 1, wherein the weight ratio of the conductive polymer to acidic polyacrylamide is from 1:50 to 1:1.

3. The conductive composition according to claim 1, wherein the weight ratio of the conductive polymer to small molecule dopant is from 1:20 to 1:1.

4. The conductive composition according to claim 1, wherein the acidic polyacrylamide is a homopolymer.

5. The conductive composition according to claim 1, wherein the acidic polyacrylamide is a copolymer.

6. The conductive composition according to claim 1, wherein the acidic polyacrylamide has an average molecular weight from 200-2,500 kDa.

7. The conductive composition according to claim 1, wherein for the repeating unit of Formula (1), R is in each case H, M is 1, and X is $SO_3H$.

8. The conductive composition according to claim 1, wherein for the repeating unit of Formula (1), $R^{2a}$ and $R^{2b}$ are each methyl and $R^1$ is hydrogen.

9. The conductive composition according to claim 1, wherein the conductive polymer comprises a poly(aniline), poly(pyrrole), poly(thiophene), poly(selenophene), poly(furan), or poly(azepine).

10. The conductive composition according claim 9, wherein the conductive polymer comprises a repeating unit of Formula (2a) or Formula (2b):

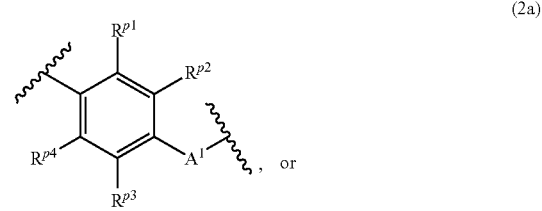

-continued

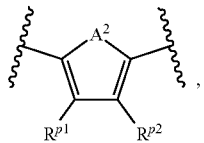

(2b)

wherein $R^{3a}$, $R^{3b}$, $R^{3c}$, and $R^{3d}$ are independently selected from hydrogen, $C_{1-6}$alkyl, $C_{1-6}$alkoxy, $C_{1-6}$haloalkyl, $C_{1-6}$haloalkoxy, F, Cl, Br, I, CN, and $NO_2$, wherein either $R^{3a}$ and $R^{3b}$ or $R^{3c}$ and $R^{3d}$ may together form a ring; and $A^1$ and $A^2$ are independently selected from OH, SH, $NHR^{p5}$, wherein $R^{p5}$ is hydrogen or $C_{1-10}$alkyl.

11. The conductive composition according to claim 1, wherein the conductive polymer is poly(aniline).

12. The conductive composition according to claim 1, wherein the dopant comprises a small molecule having 2-10 acidic groups, wherein the acidic groups are selected from COOH, $SO_3H$, $PO_3H$, and combinations thereof.

13. The conductive composition according to claim 12, wherein the dopant comprises phytic acid, 1,3,5-cyclohexanetricarboxylic acid, 1,2,3-benzenetricarboxylic acid, or 1,2,3,4-benzenetetracarboxylic acid.

14. The conductive composition according to claim 1, further comprising an additional conductive material, wherein the weight ratio of the additional conductive material:conductive polymer (based on the weight of the starting monomer) is from 25:1 to 1:25.

15. The conductive composition according to claim 14, wherein the additional conductive material comprises metal nanowires.

16. The conductive composition according to claim 15, wherein the additional conductive material comprises silver nanowires having an average diameter between 1-100 nm, and an average length from 1-100 μm.

* * * * *

UNITED STATES PATENT AND TRADEMARK OFFICE
CERTIFICATE OF CORRECTION

Page 1 of 1

PATENT NO. : 11,087,899 B2
APPLICATION NO. : 16/705516
DATED : August 10, 2021
INVENTOR(S) : Wujcik et al.

It is certified that error appears in the above-identified patent and that said Letters Patent is hereby corrected as shown below:

In the Claims

Column 20, Claim 1, Line 25 delete:
"$C_{1-4}$alkyl, wherein $R^{2a}$ and $R^{2b}$ may together from a"
And insert:
--$C_{1-4}$alkyl, wherein $R^{2a}$ and $R^{2b}$ may together form a--

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*